United States Patent
Li et al.

(10) Patent No.: US 9,030,155 B1
(45) Date of Patent: May 12, 2015

(54) MULTI-MODE CHARGER DEVICE

(75) Inventors: Xianxin Li, San Jose, CA (US);
Hong-Leong Hong, Saratoga, CA (US);
Adbullah Raouf, Newark, CA (US);
Anna Tam, Sunnyvale, CA (US); John Chi-Hung Hui, Saratoga, CA (US); Tat C. Choi, Saratoga, CA (US)

(73) Assignee: Pericom Semiconductor Corporation, Milpitas, CA (US)

( * ) Notice: Subject to any disclaimer, the term of this patent is extended or adjusted under 35 U.S.C. 154(b) by 0 days.

(21) Appl. No.: 13/540,515

(22) Filed: Jul. 2, 2012

Related U.S. Application Data

(63) Continuation of application No. 12/424,081, filed on Apr. 15, 2009, now Pat. No. 8,237,414.

(60) Provisional application No. 61/158,340, filed on Mar. 6, 2009.

(51) Int. Cl.
*H02J 7/00* (2006.01)

(52) U.S. Cl.
CPC .................................... *H02J 7/0052* (2013.01)

(58) Field of Classification Search
USPC .......................................... 320/107, 137, 138
See application file for complete search history.

(56) References Cited

U.S. PATENT DOCUMENTS

| | | | |
|---|---|---|---|
| 6,452,402 B1 | 9/2002 | Kerai | |
| 6,614,206 B1 | 9/2003 | Wong | |
| D484,094 S | 12/2003 | Xiao | |
| 6,798,173 B2 | 9/2004 | Hsu | |
| 6,936,936 B2 | 8/2005 | Fischer | |
| 6,946,817 B2 | 9/2005 | Fischer | |
| 6,980,204 B1 | 12/2005 | Hawkins | |
| 7,017,055 B1 | 3/2006 | Ho | |
| 7,170,259 B2 | 1/2007 | Veselic | |
| 7,239,111 B2 | 7/2007 | Fischer | |
| 7,291,041 B1 | 11/2007 | Yang | |
| 7,338,328 B2 | 3/2008 | Krieger | |
| 7,358,703 B2 | 4/2008 | Veselic | |
| 7,376,846 B2 | 5/2008 | Hawkins | |
| 7,426,126 B1 | 9/2008 | Lai | |
| 7,453,233 B2 | 11/2008 | Fischer | |
| 7,486,051 B2 | 2/2009 | Zhang | |
| 7,560,898 B1 | 7/2009 | Kranzen | |
| 7,923,972 B2 | 4/2011 | So | |
| 2003/0054703 A1* | 3/2003 | Fischer et al. ................ | 439/894 |
| 2004/0246341 A1 | 12/2004 | Lee | |
| 2005/0114570 A1 | 5/2005 | Chang | |
| 2005/0174091 A1* | 8/2005 | Dayan et al. ................... | 320/128 |
| 2005/0174094 A1* | 8/2005 | Purdy et al. .................... | 320/134 |
| 2005/0253560 A1* | 11/2005 | Popescu-Stanesti et al. . | 320/138 |
| 2006/0033474 A1 | 2/2006 | Shum | |

(Continued)

*Primary Examiner* — Richard Isla Rodas
*Assistant Examiner* — Nathaniel Pelton
(74) *Attorney, Agent, or Firm* — The Webostad Firm, A Professional Corporation

(57) ABSTRACT

Multi-mode charger device for charging portable devices and methods of charging portable devices are described. In an embodiment, a multi-mode charger device has mode blocks respectively associated with modes of operation which are coupled to a switch module. The switch module is for coupling a selected one of the mode blocks to a peripheral bus and to decouple the mode blocks remaining from the peripheral bus. A first mode of the modes of operation is a pass through mode. A second mode of the modes of operation is a first charging mode. A third mode of the modes of operation is a second charging mode. The first charging mode and the second charging mode are different from one another.

19 Claims, 29 Drawing Sheets

(56) References Cited

U.S. PATENT DOCUMENTS

| | | |
|---|---|---|
| 2006/0170393 A1 | 8/2006 | Yang |
| 2006/0181241 A1 | 8/2006 | Veselic |
| 2007/0024239 A1 | 2/2007 | Park |
| 2007/0108938 A1 * | 5/2007 | Veselic .................. 320/111 |
| 2008/0042616 A1 | 2/2008 | Monks |
| 2008/0272741 A1 * | 11/2008 | Kanamori .................. 320/137 |
| 2008/0278002 A1 | 11/2008 | Platania |
| 2009/0009187 A1 * | 1/2009 | Kwak .................. 324/630 |
| 2010/0207585 A1 * | 8/2010 | Duvalsaint et al. .......... 320/136 |
| 2011/0025277 A1 * | 2/2011 | Hussain et al. ............. 320/163 |

* cited by examiner

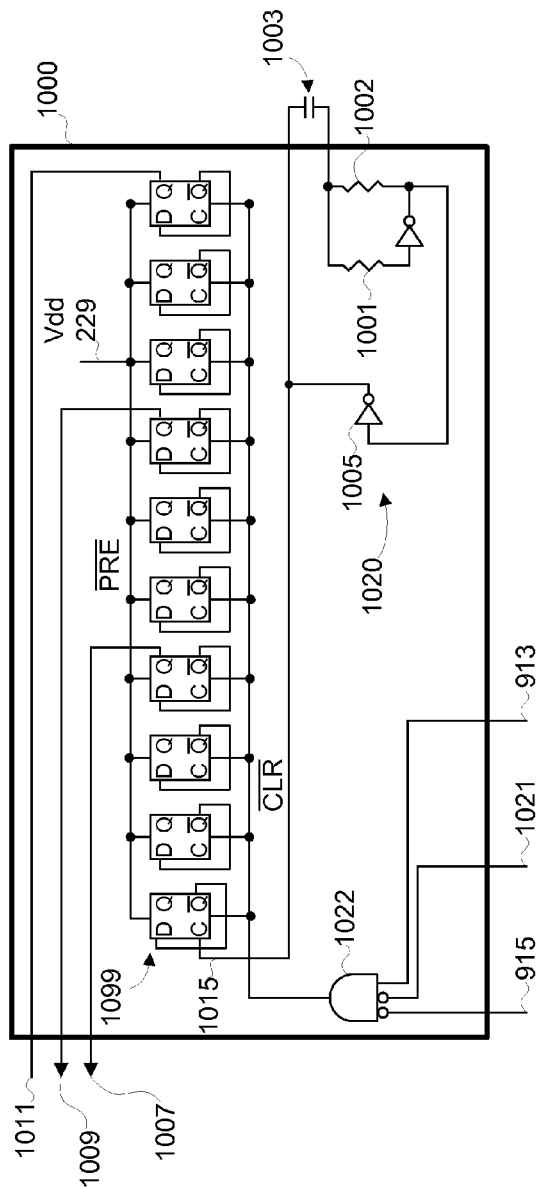
FIG. 10A
FIG. 10B
FIG. 10C

MULTI-MODE CHARGER DEVICE

CROSS-REFERENCE TO RELATED APPLICATIONS

This is a continuation application of U.S. nonprovisional patent application Ser. No. 12/424,081, filed Apr. 15, 2009, which claims benefit to U.S. provisional patent application No. 61/158,340, filed Mar. 6, 2009, each of which is incorporated herein by reference in its entirety for all purposes.

FIELD

One or more aspects of the invention generally relate to integrated circuits ("ICs") and, more particularly, to a multi-mode charger device.

BACKGROUND

Portable devices from various manufactures, such as Nokia, Samsung, Ericsson, Apple, Research In Motion, Palm, or the like, have a variety of different charging conditions. Conventionally, a charger from one of such manufacturers would not work on a portable device of another manufacturer. Furthermore, different countries may impose different charging conditions, such as for example the Peoples Republic of China ("China"), and as such, manufacturers manufacturing devices for regional use may have yet another charging condition different from non-regional devices' charging conditions. Thus, even though portable devices made for regional use, such as in China, may have same charging conditions, conventionally such devices were not charging compatible with devices from outside such region. However, many of such portable devices from various manufacturers have Universal Serial Bus ("USB") ports that are operative with USB ports of other devices, such as computers, other portable devices, hubs, electronic appliances, and the like.

Accordingly, it would be both desirable and useful to provide means for a "universal" charger that allows two or more portable devices with different charging conditions or protocols to be charged by such "universal" charger.

BRIEF SUMMARY

One or more aspects generally relate to integrated circuits ("ICs") and, more particularly, to a multi-mode charger.

Along those lines, an embodiment of a multi-mode charger is described. The multi-mode charger includes mode blocks respectively associated with modes of operation. A switch module is configured to couple a selected one of the mode blocks to a peripheral bus and to decouple the mode blocks remaining from the peripheral bus. A first mode of the modes of operation is a pass through mode. In the pass through mode, the switch module is configured to couple a peripheral bus controller to the peripheral bus for communication. A second mode of the modes of operation is a first charging mode. In the first charging mode, the switch module is configured to couple a first mode block of the mode blocks to the peripheral bus, the first mode block being associated with the first charging mode. A third mode of the modes of operation is a second charging mode. In the second charging mode, the switch module is configured to couple a second mode block of the mode blocks to the peripheral bus, the second mode block being associated with the second charging mode. The first charging mode and the second charging mode are different from one another.

Another embodiment includes a multi-mode charger including mode blocks respectively associated with modes of operation. A switch module is configured to couple a selected one of the mode blocks to a Universal Serial Bus ("USB") and to decouple the mode blocks remaining from the USB. A first mode of the modes of operation is a pass through mode. In the pass through mode, the switch module is configured to couple a USB controller to the USB for data transfer. A second mode of the modes of operation is a first charging mode. In the first charging mode, the switch module is configured to couple a first mode block of the mode blocks to the USB, the first mode block being associated with the first charging mode. A third mode of the modes of operation is a second charging mode. In the second charging mode, the switch module is configured to couple a second mode block of the mode blocks to the USB, the second mode block being associated with the second charging mode. The first charging mode and the second charging mode are different from one another. Control circuitry for controlling distribution of power to the USB is responsive to a selected mode of operation of the modes of operation. The control circuitry is further configured to detect when a peripheral device is coupled to the USB.

Yet another embodiment is method for charging a portable device, including: exiting a data communication mode; resetting an interface to cause the portable device coupled thereto to reset; entering a first charging mode; determining whether first charging conditions for the first charging mode are met; responsive to the first charging conditions being met, passing power to the portable device for charging thereof while in the first charging mode; responsive to the first charging conditions not being met, repeating of the resetting; entering a second charging mode; determining whether second charging conditions for the second charging mode are met; responsive to the second charging conditions being met, passing power to the portable device for charging thereof while in the second charging mode; responsive to the second charging conditions not being met, repeating of the resetting.

Still yet another embodiment is a method for charging, including: exiting a data communication mode; resetting an interface to cause any portable device coupled thereto to reset; determining whether the portable device is coupled to the interface; and if the portable device is determined to be coupled to the interface, then initiating a charging mode detection loop. The charging mode detection loop includes: entering a first charging mode; determining whether first charging conditions for the first charging mode are met; responsive to the first charging conditions being met, branching out of the charging mode detection loop for passing power to the portable device for the charging thereof while in the first charging mode; responsive to the first charging conditions not being met, repeating of the resetting; entering a second charging mode; determining whether second charging conditions for the second charging mode are met; responsive to the second charging conditions being met, branching out of the charging mode detection loop for passing power to the portable device for the charging thereof while in the second charging mode; and responsive to the second charging conditions not being met, repeating of the resetting.

Yet a further embodiment is a method for charging a portable device, including: disabling pins of a connector for use of a data communication mode and any of a plurality of charging modes to cause the portable device to reset an interface associated with the connector; determining if the portable device uses a first charging mode of the plurality of charging modes; responsive to a first determination that the portable device uses the first charging mode, electrically coupling a power source to the connector for passing power to the portable device for charging thereof; and responsive to a second determination that the portable device does not use the first charging mode, repeating the disabling step, and repeating the determining step for a second charging mode of the plurality of changing modes.

BRIEF DESCRIPTION OF THE DRAWING(S)

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 10A is a circuit diagram depicting an exemplary embodiment of a clock generator for the charger device of FIG. 9.

FIG. 10B is a circuit diagram depicting an exemplary embodiment of power-on reset circuit for the charger device of FIG. 9.

FIG. 10C is a signal diagram depicting an exemplary embodiment of an output pulse for the power-on reset circuit of FIG. 10B.

DETAILED DESCRIPTION

Figure 1A:
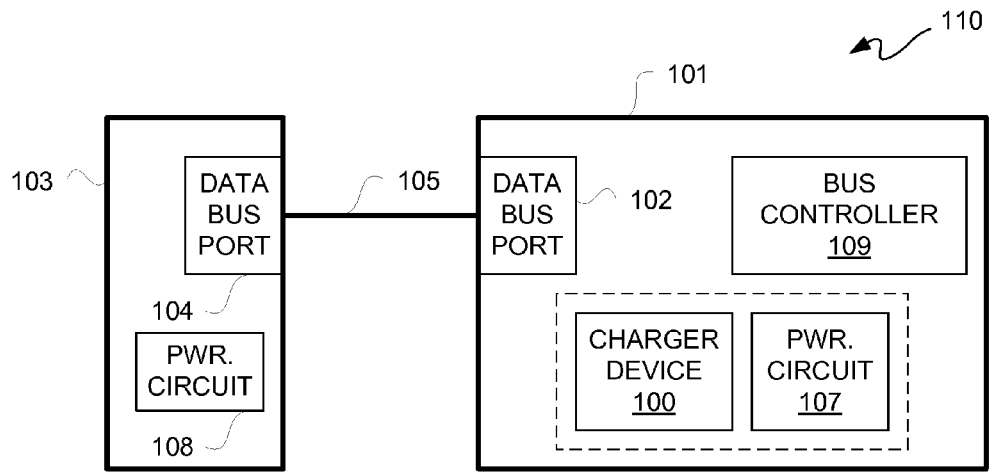
FIG. 1A is a block diagram depicting an exemplary embodiment of a computing system.

In the following description, numerous specific details are set forth to provide a more thorough description of the specific embodiments. It should be apparent, however, to one skilled in the art, that the invention may be practiced without all the specific details given below. In other instances, well-known features have not been described in detail so as not to obscure the embodiments. For ease of illustration, the same number labels are used in different diagrams to refer to the same items; however, in alternative embodiments the items may be different. Furthermore, though particular numerical values are described herein for purposes of clarity by way of example, it should be understood that the scope of the description is not limited to these particular numerical examples as other values may be used.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within registers or memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of an integrated circuit ("IC") system, or similar electronic computing device, that manipulates and transforms data represented as physical (electronic) quantities within the computer system's registers and memories into other data similarly represented as physical quantities within such system or device memories or registers or other such information storage, transmission or display devices.

The present system and methods also relate to an apparatus for performing the operations herein. This apparatus may be specially constructed for the required purposes, or it may comprise a general-purpose IC system or computing device selectively activated or reconfigured by a program. Such a program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

FIG. 1A is a block diagram depicting an exemplary embodiment of a computing system 110. Computing system 110 includes a personal computer or workstation 101 coupled to a portable device 103 via a cable 105. Portable device 103 may be any of a variety of portable devices including Global Position Systems ("GPSs"), MP3/MP4 players, backup or replacement battery, cell phones, and smart phones, among other types of portable devices having a data bus port 104, where data bus port 104 may be used for charging such a portable device 103 thereof. Portable device 103 may further include a power control circuit 108 for charging via data bus port 104 thereof, among other known details which are not described in unnecessary detail herein.

Workstation/personal computer ("computer") 101 may be a desktop, tower, laptop, notebook, or other type of computer. Computer 101 may include a data bus port 102, and a bus controller 109, among other components thereof.

Added to computer 101 is at least a charger device 100. Additionally, a modified power circuit 107 may be added to computer 101. Charger device 100 may be implemented as a single integrated circuit chip ("IC"). Optionally, modified power circuit 107, or a portion thereof, may be combined on a same IC as charger device 100 or may be part of a same multi-die module. Even though computer system 110 is illustratively depicted having only a single data bus port 102, it should be appreciated that multiple USB ports may be built into computer 110.

Charger device 100 may be used to facilitate computer 101 to charge portable device 103 via data bus ports 102 and 104. Data bus ports 102 and 104 may be Universal Serial Bus ("USB") ports or connectors. Cable 105 may be a USB cable. Alternatively, cable 105 may be omitted for a direct plug USB portable device. Bus controller 109 may be a USB bus controller. Computer 110 via charger device 100 may be configured to charge portable device 103 when computer 101 is plugged in or on battery power. Furthermore, computer 101 may be used to charge portable device 103 when computer 101 is in a powered-on operative ("awake") mode, a hibernate mode, a sleep mode, or powered off, or other mode in which charger device 100 receives power and power may be provided via power circuit 107 to USB port 102.

In order to charge different types of portable devices 103, charger device 100 may be used to communicate with a charging source via power circuit 107 to accommodate different charging protocols or conditions. As described below in additional detail, data plus ("D+") and data minus ("D−") pins of USB ports 102 and 104 are used for different charging modes. These charging modes may involve different voltages, resistances, or currents, with or without timing requests, which may involve use of D+ and D− pins. Additionally, it should be understood that such D+ and D− pins may be used for a data communication mode, and thus in addition to the charging modes, device charger 100 is configured to allow for such data communication mode. Even though a USB interface is described, it should be understood that any interface that uses data pins for invoking a charging mode separate from a power supply pin may be used.

From the following description, it will be understood that charger device 100 may be used to provide different communication/charging modes responsive to different types of portable devices 103 where charging is provided via a USB port 102 to a USB port or interface 104. In an embodiment of charger device 100, an end user may manually switch, via a graphical user interface ("GUI"), binary input/output system ("BIOS"), or electro-mechanical switches, or a combination thereof, to accommodate different portable devices 103. In other embodiments, charger device 100 is configured to automatically detect charging protocol of portable device 103 and switch between charging modes for different portable devices, as well as switching between a communication mode and a charging mode, without having to use user intervention or intervention from a program.

Figure 1B:
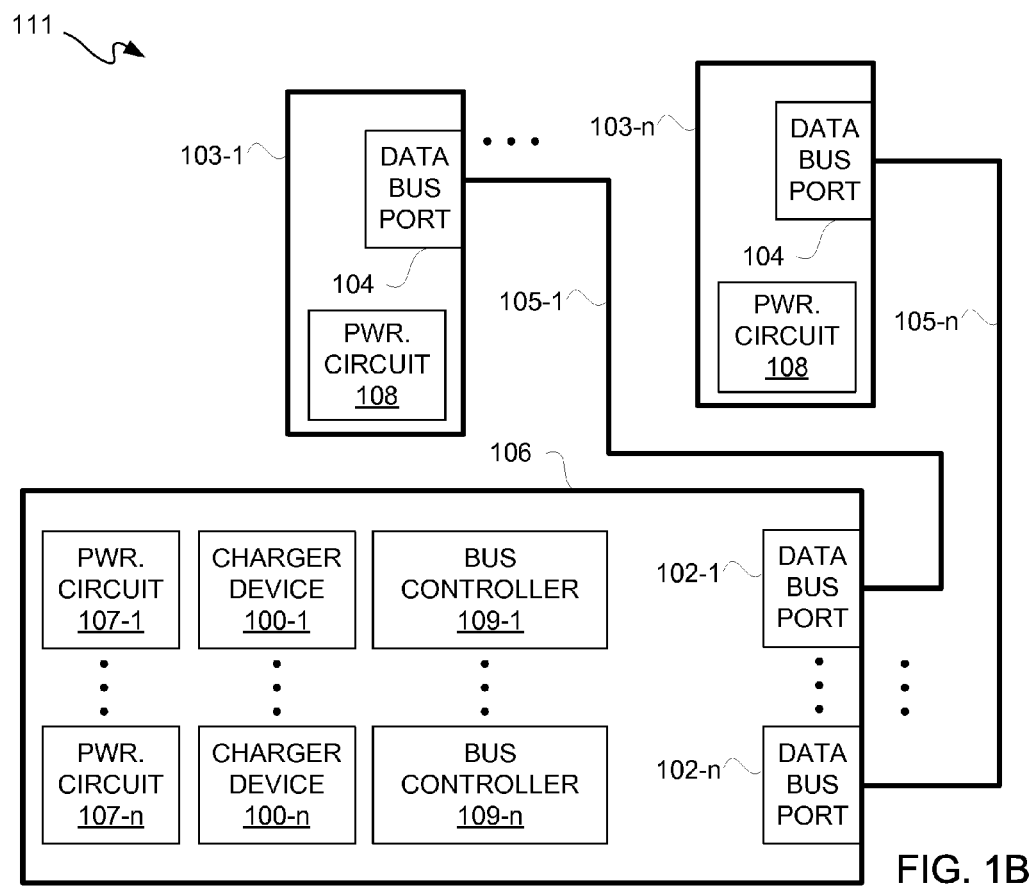
FIG. 1B is a block diagram depicting an exemplary embodiment of a USB hub system.

FIG. 1B is a block diagram depicting an exemplary embodiment of a USB hub system 111. USB hub system 111 may include USB hub 106 and one or more portable devices 103-1 through 103-n, for n a positive integer greater than one. USB hub 106 allows multiple USB devices to be connected to a single USB port on a host computer, such as USB port 102 of computer 101. However, USB hub 106 may be connected to a USB port on another hub or on some other device. It should be appreciated that USB hubs may be integrated into keyboards, monitors, printers, or other electronic devices.

Again, some USB devices are directly plugged into a USB port, where a connecting cable, such as cable 105-*n*, may be omitted.

USB hub system 111 includes portable devices 103-1 through 103-*n*, for n a positive integer greater than one. It should be understood that multiple portable devices of portable devices 103-1 through 103-*n* need not be coupled to a USB hub 106 at the same time, but rather multiple portable devices of portable devices 103-1 through 103-*n* may be coupled to a USB hub 106 at the same time. Portable devices 103-1 through 103-*n* are respectively coupled to data bus ports 102-1 through 102-*n*. Respectively associated with each of data bus ports 102-1 through 102-*n* may be bus controllers 109-1 through 109-*n*, charger devices 100-1 through 100-*n*, and power circuits 107-1 through 107-*n*. Again, some or all of power circuits 107-1 through 107-*n* may respectively form part of the same IC or multi-die module as charger devices 100-1 through 100-*n*. Data bus ports 102-1 through 102-*n* may be respectively coupled via cables 105-1 through 105-*n* to data bus ports 104 of portable devices 103-1 through 103-*n*.

In this embodiment, it should be understood that USB hub 106 may be a bus powered hub, namely a hub that draws its power for example from computer 101, or a self-powered hub, namely a hub that takes power from an external power supply. In order to comply with a USB specification, allocation units of 100 milliamps up to a maximum total of 500 milliamps per port may be provided. Accordingly, a compliant bus powered hub may have no more than four downstream ports offering no more than four 100 milliamp units of current in total to downstream devices, where one of such 100 milliamp units is for powering the hub itself. In contrast, a self-powered hub may provide up to 500 milliamps to each USB port thereof. Even though separate bus controllers 109-1 through 109-*n* are illustratively depicted, it should be appreciated that some IC bus controllers support multiple USB ports. Accordingly, there may be less than n of bus controllers 109-1 through 109-*n*.

When a portable device 103 or other USB device is attached to a USB port 102 on a hub, whether such hub is integrated in a computer 101 or not, such hub detects the device by a pull-up resistor of such portable device on either a D+ or D− pin, and signals a host device via this interrupt end point. Use of a pull-up resistor is described below in additional detail.

For purposes of clarity by way of example and not limitation, a computer 101 embodiment of FIG. 1A is further described even though other embodiments which follow from such description may be implemented. Furthermore, while the examples of a computer 101 and USB hub 106 are illustratively depicted, it should be understood that any device having a USB port capable of receiving power for charging a portable device may be implemented with a charger device 100 as described herein.

Figure 2:
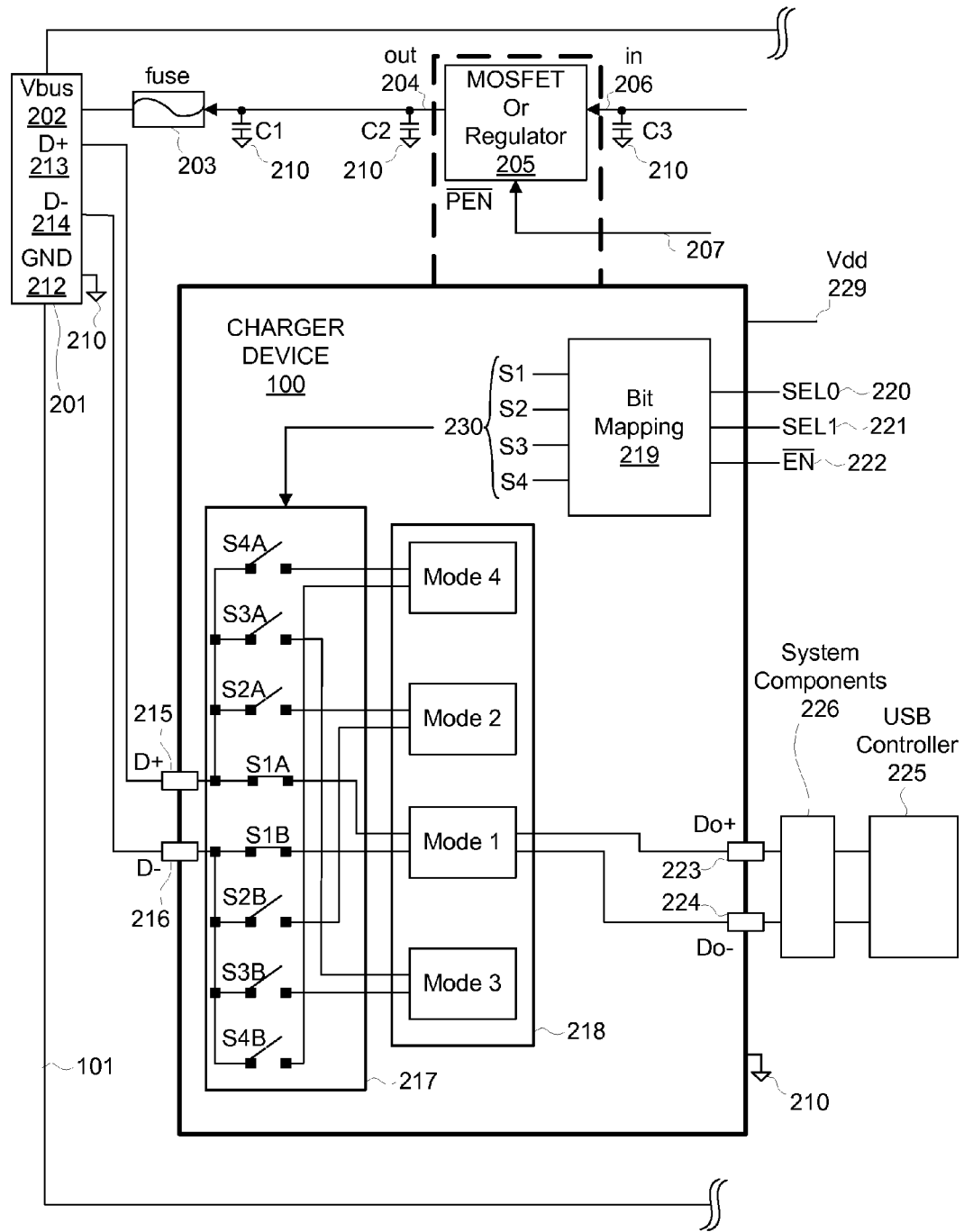
FIG. 2 is a block/circuit diagram depicting an exemplary embodiment of a computer having a charger device therein.

Referring to FIG. 2, there is shown a block/circuit diagram depicting an exemplary embodiment of a computer 101 having charger device 100 therein. Again, charger device 100 may be implemented as a single IC.

A data bus port, such as USB connector 201, has four pins, namely a ground pin 212, a D− pin 214, a D+ pin 213, and a voltage bus pin ("Vbus") 202. A Vbus pin 202 is coupled to a fuse 203, and fuse 203 is coupled at output node 204 of a power MOSFET or voltage regulator 205. Optionally, MOSFET or voltage regulator 205 may be part of the same IC or same multi-die module as charger device 100, in which embodiment one or more of capacitors C1, C2, and C3 may or may not be included. MOSFET or voltage regulator ("power block") 205 may be included in power circuit 107 of FIG. 1A.

A ground pin 212 of USB connector 201 may be connected to ground 210. A D+ pin 213 and a D− pin 214 of USB connector 201 may be respectively coupled to a D+ pin 215 and a D− pin 216 of charger device 100.

Capacitors C1 and C2 may be respectively coupled between output node 204 and ground 210. Power block 205 may have an input node 206, and a capacitor C3 may be coupled between ground 210 and input node 206. Input node 206 may be coupled to a Vdd supply level from a power source (not shown) when plugged in. It should be understood that Vdd 229 for powering charger device 100 may be lower than Vdd provided to power block 205. In such condition of operation, a power MOSFET of power block 205 is used. An example of such supply voltage may be approximately 5.0 volts or other voltage level depending on application. When power is supplied from a battery, a voltage regulator of power block 205 may be used. For example, a regulated voltage may be from approximately 5.5 to 20 volts, depending on application. Furthermore, depending on application other voltages may be used.

Selecting between a power MOSFET or voltage regulator for power block 205 is determined by a power enable ("/PEN") signal 207. Power enable ("control") signal 207, as well as select 0 ("SEL0") signal 220, select 1 ("SEL1") signal 221, and enable ("/EN") signal 222 (collectively "control signals") may all be provided from a general purpose input/output interface ("GPIO") or from an electro-mechanical switch, such as a DIP switches, not illustratively shown for purposes of clarity. Furthermore, such signals may be provided by a user, such as via a GUI, or by BIOS, or a combination thereof. Optionally, capacitors C1 through C3, power block 205, and fuse 203 may all be part of a power circuit 107 of FIG. 1A.

Charger device 100 may include a switch module 217 and mode blocks 218 as well as a bit mapping block 219. Even though the example of four modes is illustratively depicted, it should be understood that one data communication mode, namely Mode 1, and two or more charging modes, such as at least any two of Modes 2, 3, and 4, may be implemented. Even though the example of Modes 1 through 4 are illustratively depicted, it should be appreciated that two or more than three charging modes may be implemented in an embodiment of charger device 100. Furthermore, even though particular circuits are depicted to comply with known charging conditions, it should be understood that other charging conditions may be accommodated with other Mode blocks.

For four modes of operation, charger device 100 has a switch module having four pairs of switches. As illustratively depicted in FIG. 2, switches S1A and S1B of switch pair S1 are closed, and switch pairs S2, S3, and S4 have their switches open. In this mode of operation, Mode 1 is active. Mode 1 is a pass through mode where D+ pin 215 and D− pin 216 are respectively coupled via switches S1A and S1B to D output plus pin 223 and D output minus pin 224. Pins 223 and 224 may be coupled to system components 226 of computer 101, and system components 226 may be coupled to a USB controller 225 of computer 101. System components 226 and USB controller 225 may form a bus controller 109 of FIG. 1A.

Switch pairs S1 through S4 of switch module 217 are controlled respectively by control signals 230, namely control signals S1, S2, S3, and S4 respectively provided from bit mapping block 219. Control signals 230 may be generated responsive to control signals 220 through 222. Control signals 230 are provided to switch module 217 such that control signals S1, S2, S3, and S4 respectively switch pairs of switches S1, S2, S3, and S4 on and off, as described below in additional detail.

It should be understood that charging modes 2 through 4 correspond to different charging conditions or protocols for supporting different types of portable devices 103. It should be further understood that Mode 1 in this embodiment is a USB data communication mode. For example, Mode 1 may be any USB mode, such as for example USB 1.1, 2.0, or 3.0.

Control signal 207 and control signals 220 through 221 are additionally described with reference to truth Table 1 below.

TABLE 1

| SEL1 | SEL0 | /EN | /PEN | Results |
|---|---|---|---|---|
| X | X | 1 | 1 | Disable modes ("Mode 0") |
| 0 | 0 | 0 | 0 | Mode 1 |
| 0 | 1 | 0 | 0 | Mode 2 |
| 1 | 0 | 0 | 0 | Mode 3 |
| 1 | 1 | 0 | 0 | Mode 4 |

As indicated in the first row of Table 1, if enable signal 222 and power enable signal 207 are both logic 1, then select 0 signal 220 and select 1 signal 221 are both a don't care status. The result of this combination of signals is that D+ and D− pins are disabled, as well as disabling power block 205. This disabling of D+ pin 213 and D− pin 214 and power block 205 may be for a duration of approximately 0.1 to 1 seconds, or other sufficient duration, to accommodate switching between modes, such as Modes 1 through 4. When control signal 207 and control signals 220 through 222 are all logic 0, Mode1 is invoked.

When select 0 signal 220 is logic 1 and control signals 207, 221, and 222 are all logic 0, Mode 2 is active. Mode 2 may include reference voltages requested by a portable device for a charging mode. When select 1 signal 221 is logic 1 and control signals 207, 220 and 222 are logic 0, Mode 3 may be invoked, namely a host USB charger mode. Lastly, when select signals 220 and 221 are logic 1 and enable signals 207 and 222 are logic 0, Mode 4 may be invoked. Mode 4 may be a dedicated USB charging mode. Modes 1 through 4, as well as Mode 0 for disabling Modes 1 through 4, are described below in additional detail. Mode 0 may be thought of as a separate mode or part of Modes 1 through 4 when rotating modes as described below in additional detail. However, for purposes of clarity, disabling of all operating modes, namely disabling of Modes 1 through 4 in this embodiment, shall be referred to as Mode 0. Modes 0 through 4 may be integrated into a single IC chip, may be implemented using discrete components, or a combination thereof.

By disabling control signals 220 and 221 for Mode 0, D+ and D− pins 213 and 214 effectively mimic a re-plugging of a portable device 103 to be charged. Such mimicking of re-plugging resets such portable device 103 to re-detect status on D+ pin 213 and D− pin 214 of USB connector 201. Accordingly, as previously described, disabling Modes 1 through 4 by invoking Mode 0 may be for switching between Modes in order to cause a re-detect for invoking a different Mode. Some portable devices 103 may only detect status of D+ and D− pins when initially plugged into a USB connector 201. Accordingly, such types of portable devices 103 do not perform a re-detect unless unplugged and then re-plugged into USB connector 201. So, for example, if a portable device 103 is plugged in and then detects a data communication mode, such portable device 103 stays in such data communication mode, namely Mode 1, until it is re-plugged into such USB connector 201 and such USB connector 201 has been reset for a charging mode. Thus, for transitioning to a charging mode, voltage on Vbus pin 202 may go from approximately 0 to 5 volts or some other supply voltage level. Likewise, for some portable devices 103, in order to go back to a data communication mode, such device has to be unplugged from USB connector 201, USB connector 201 has to be reset for a data communication mode, and then such portable device may be re-plugged in to be in such data communication mode.

To recapitulate, in Mode 1, charger device 100 is set to operate as a USB port for data communication. Modes 2, 3, and 4 are charging modes. In any of Modes 2, 3, and 4, charger device 100 is configured to operate as a USB charger for any of a variety of portable devices 103 having different charging conditions and being capable of being connected to and charged via USB connector 201.

To be charged, different portable devices 103, which may be connected to USB connector 201, communicate with a charging source, such as computer 101 with charger device 100, with different charging conditions or protocols. These different protocols are provided through D+ and D− pins 213 and 214 of USB connector 201. Such different protocols may be used to request for example reference voltage or reference resistance on D+ and D− pins 213 and 214, which correspond to D+ and D− pins 215 and 216 of device charger 100. Furthermore, sometimes there may be a timing request as part of such protocols or conditions for determining if charging is to be performed or not.

For purposes of clarity by way of example and not limitation, it shall be assumed that Mode 2 is for charging with requested reference voltages ("Vref1," "Vref2") on D+ and D− respectively. For Mode 3, it shall be assumed that a host USB charger for a battery charging mode compliant with revision 1.0, Mar. 8, 2007, USB Implementers Form Inc., specification is implemented. Lastly, for Mode 4 it shall be assumed that a dedicated USB charger mode compliant with a "battery charging specification" revision 1.0, Mar. 8, 2007, USB Implementer Form Inc., which may be used as a China USB charger compliant to China USB charger specification "YD-T 1591-2006", is implemented. Thus it should be understood that the same USB Implementers Form Inc. revision is recited for two different charging conditions, namely one is for a "host USB charger" and the other is for a "dedicated USB charger".

Figure 3:
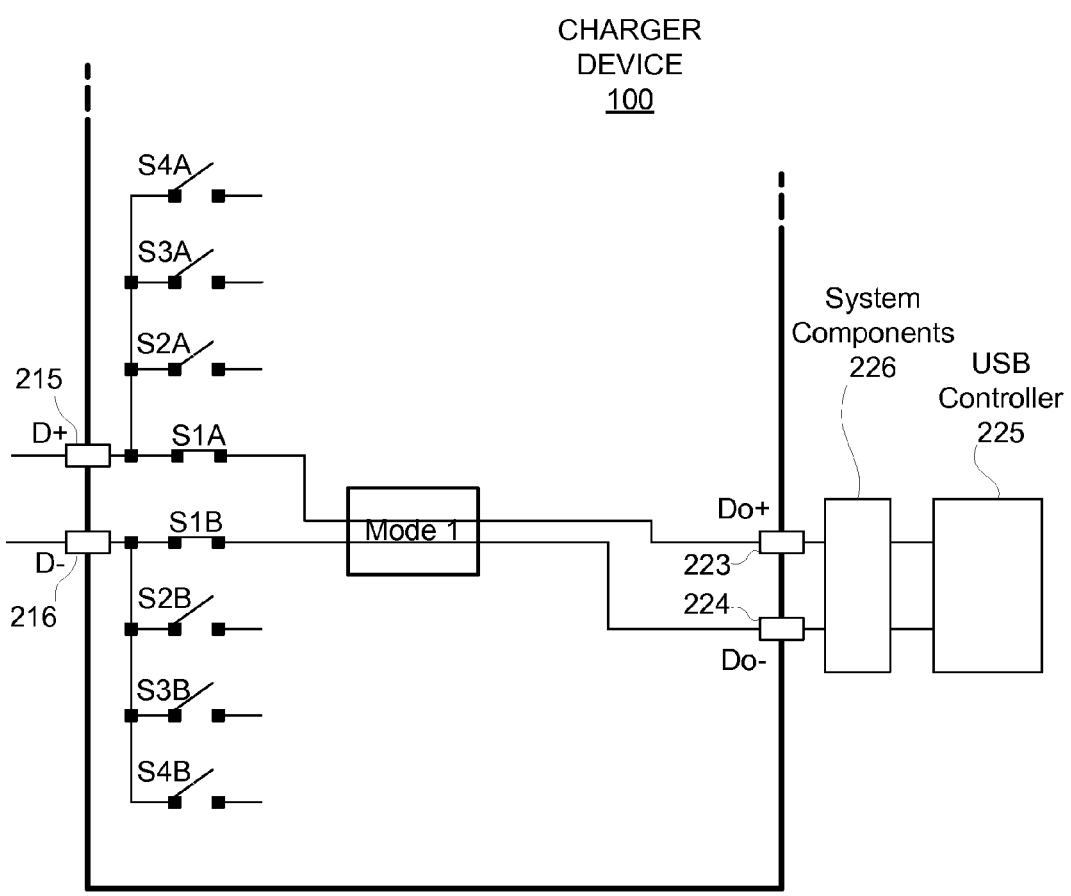
FIG. 3 is a block/circuit diagram depicting an exemplary embodiment of the charger device of FIG. 2 in a data communication mode.

FIG. 3 is a block/circuit diagram depicting an exemplary embodiment of charger device 100 in Mode 1. In Mode 1, it should be understood that D+ pin 215 is directly coupled to D output plus pin 223 via switch S1A, and D− pin 216 is directly coupled to D output minus pin 224 via switch S2B. In Mode 1, switch pair S1 is in an on or closed position, and switch pairs S2, S3, and S4 are in an off or open position. It is assumed that system components 226 and USB controller 225 may be for supporting one or more of USB 1.1, USB 2.0, and USB 3.0. Accordingly, system components 226 and USB controller 225 may include resistors, transistors, capacitors, and other circuit elements that may be used for a system-level USB interface design, and thus may be conventional. When switches S1A and S1B are both off, access to system components 226 and USB controller 225 are not available. Accordingly, system components 226 and USB controller 225 are not affected by any charging mode.

Figure 4A:
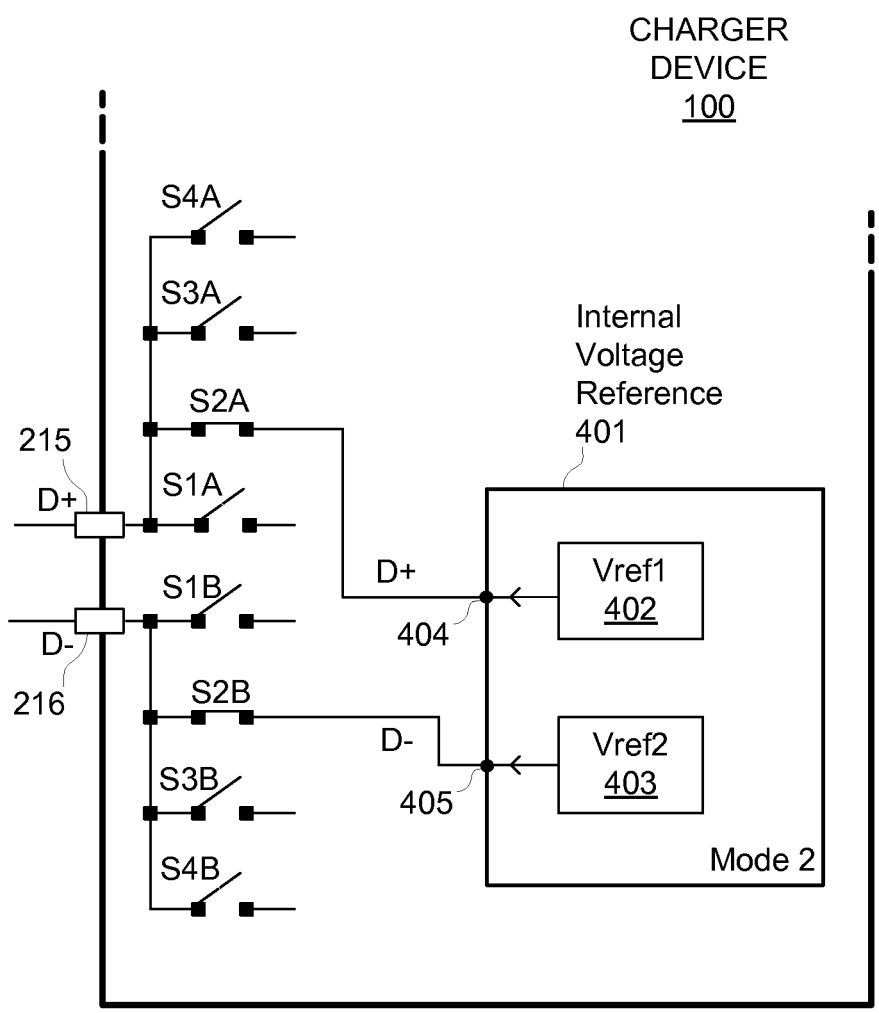
FIG. 4A is a block/circuit diagram depicting an exemplary embodiment of the charger device of FIG. 2 in a charging mode.

FIG. 4A is a block/circuit diagram depicting an exemplary embodiment of charger device 100 in charging Mode 2. In charging Mode 2, an internal voltage reference 401 is used for providing a first reference voltage ("Vref1") block 402 and a second reference voltage ("Vref2") block 403. Voltage associated with Vref1 block 402 is provided to D+ pin 215 via switch S2A, and voltage provided from Vref2 block 403 is provided to D− pin 216 via switch S2B. Accordingly, switch pair S2 has both switches in the "on" position and all other switches of S1, S3, and S4 pairs are in the "off" position. Thus output node 404 of internal voltage reference 401 from Vref1 block 402 is for a D+ input to a portable device 103 via a USB connector 201, and reference voltage at output node 405 of internal voltage reference 401, from Vref2 block 403 is for providing voltage on a D− pin of portable device 103 via a USB connector 201.

In charging Mode 2, portable devices 103 requesting reference voltages, such as Vref1 and Vref2 on D+ and D− pins respectively, as a condition for charging are provided by charger device 100. Charger device 100 may generate voltage references to D+ pin 215 and D− pin 216 as those pins are respectively coupled to D+ and D− pins of USB connector 201. Vref1 and Vref2 blocks or voltage source circuits 402 and 403 may be implemented by any of a variety of voltage generators or may be implemented with respective voltage dividers coupled to Vdd 229 and ground 210. Of course, the actual voltage values for Vref1 and Vref2 may vary depending on implementation of a portable device requesting such voltages. Manufacturers of portable devices 103 may specify such voltages. For example an Apple iPod or iPhone may have specific voltage values for Vref1 and Vref2, where such voltages are different from one another. Furthermore, voltage source circuits 402 and 403 may be integrated in charger device 100, may use external components for coupling to charger device 100, or a combination thereof.

Figure 4B:
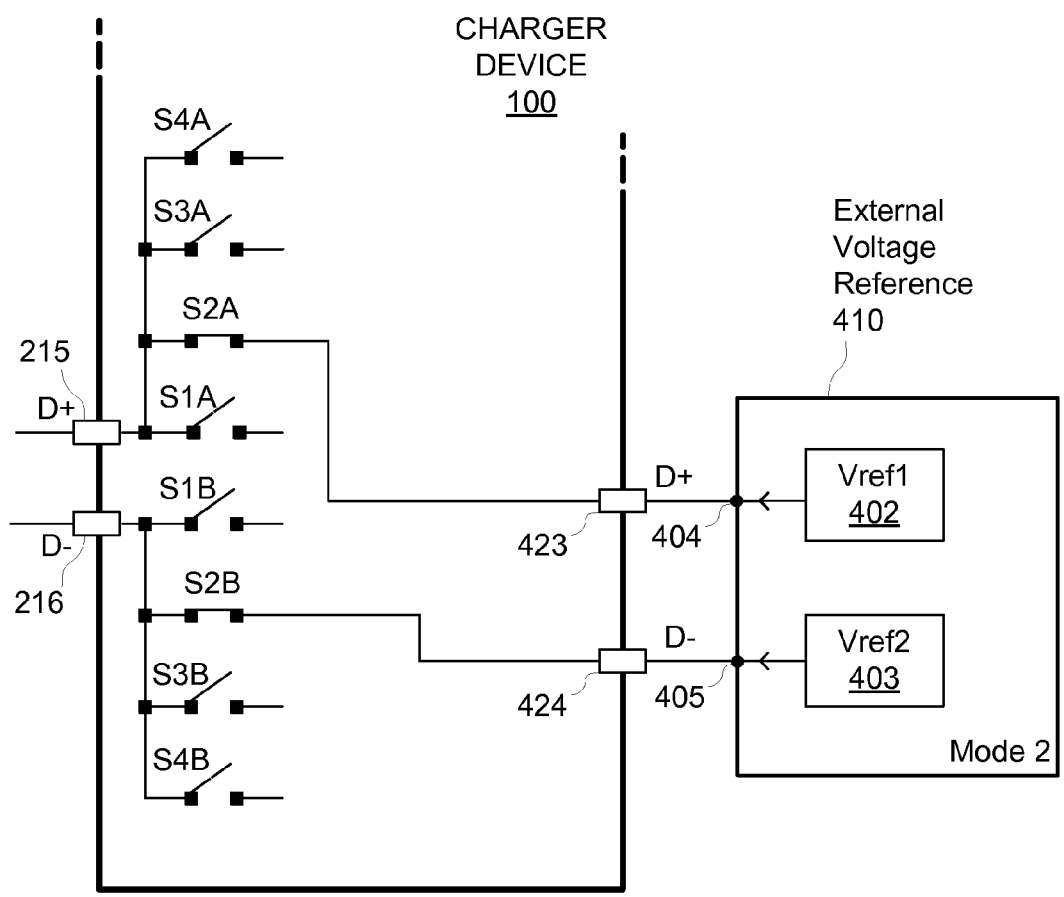
FIG. 4B is a block/circuit diagram depicting an exemplary embodiment of the charger device of FIG. 4A but with an external voltage reference.

FIG. 4B is a block/circuit diagram depicting an exemplary embodiment of charger device 100 but with an external voltage reference 410. External voltage reference 410 includes voltage source circuits 402 and 403 for operating in Mode 2; however, output nodes 404 and 405 are respectively directly coupled to input pins 423 and 424 of charger device 100. Input pins 423 and 424 are directly coupled to D+ and D− pins 215 and 216 via switches S2A and S2B, respectively. An external voltage reference 410, which is external to charger device 100, may be used with resistor values selected for an application in contrast to fixed values of an internal voltage reference 401 as previously described with reference to FIG. 4A.

Figure 5A:
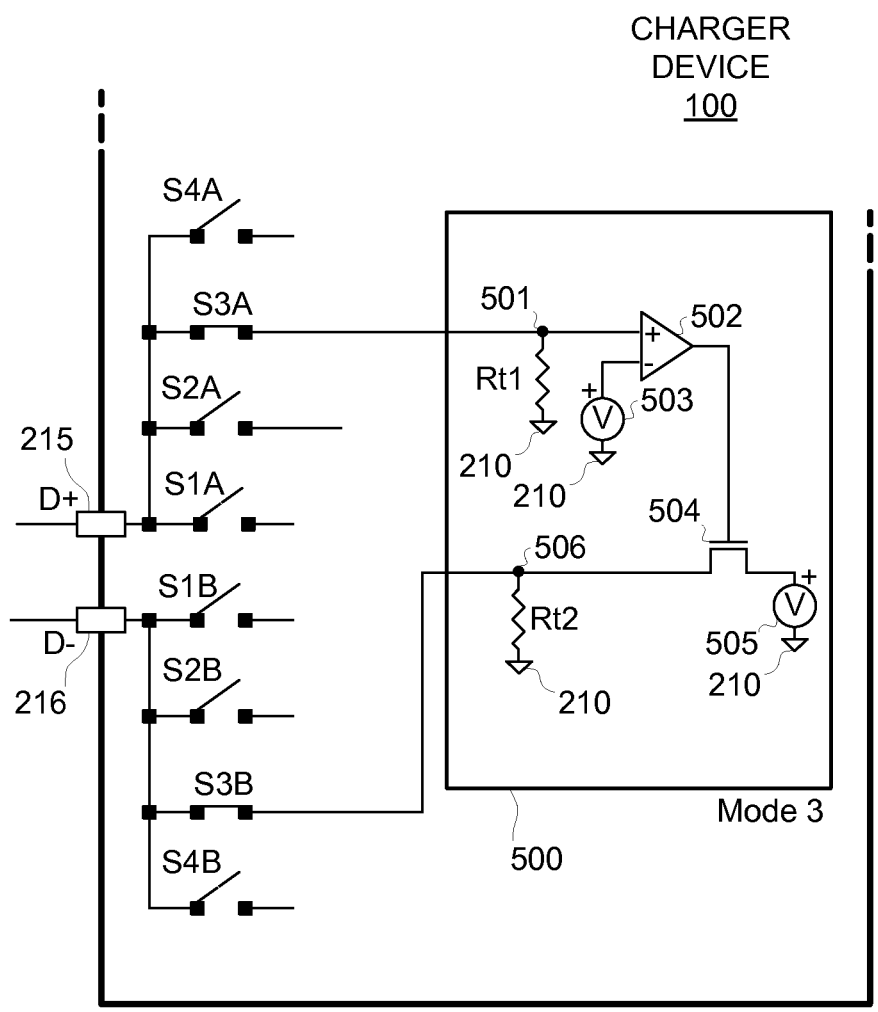
FIG. 5A is a block/circuit diagram depicting an exemplary embodiment of the charger device of FIG. 2 for operating in another charging mode.

FIG. 5A is a block/circuit diagram depicting an exemplary embodiment of charger device 100 for operating in charging Mode 3. For operating in charging Mode 3, switches S3A and S3B are in a closed or "on" position, and pairs of switches S1, S2, and S4 are all in an open or "off" position. D+ pin 215 is directly coupled via switch S3A to input node 501 of voltage source circuit 500. Again, for purposes of clarity by way of example, specific values are used for implementation of a "battery charging specification" revision 1.0, Mar. 8, 2007, from a USB Implementer Forum, Inc.; however, it should be appreciated that values other than those specifically described herein may be used, as may vary from application to application.

A resistor Rt1, which in this example is an approximately a 15K ohm resistor, is coupled between input 501 and ground 210. Input node 501 is coupled to a plus input port of comparator 502. A minus input port of comparator 502 is coupled to a plus port of a voltage source 503. Voltage source 503, having a minus port coupled to ground 210, in this example is approximately a 0.4 volt source. If a portable device 103 is compliant with such a host USB charging specification, such portable device 103 sends approximately a 0.7 volt reference voltage on a D+ pin to arrive at D+ pin 215. Such 0.7 volt reference voltage is provided to input node 501 via switch S3A for input to a plus port of comparator 502. Comparator 502 compares the incoming voltage on node 501, such as 0.7 volts, with the voltage from voltage source 503, such as 0.4, volts, and for voltage on node 501 being greater, comparator 502 outputs a logic high voltage output to a gate of NMOS transistor 504. Such logic high voltage level provided to NMOS transistor 504 causes such transistor to be in a substantially conductive or "on" state.

Providing such a logic high voltage to a gate of transistor 504 causes transistor 504 to conduct approximately 0.7 volts from voltage source 505 to output node 506 of voltage source circuit 500. Voltage source 505 which is approximately 0.7 volts has its plus terminal connected to a source of transistor 504 and has its terminal thereof connected to ground 210. A drain of transistor 504 is coupled to output node 506. A resistor Rt2, which in this example is approximately a 15K ohm resistor, is coupled between output node 506 and ground 210. Output node 506 is directly coupled via switch S3B to D− pin 216. Thus with a logic high voltage level sufficient for turning on transistor 504 provided from the output of comparator 502, D− pin 216 generally receives a 0.7 voltage value for providing to a portable device 103. Such portable device 103 receives such 0.7 volts on a D− pin of a USB connector 201 for entering a charging mode.

Figure 5B:
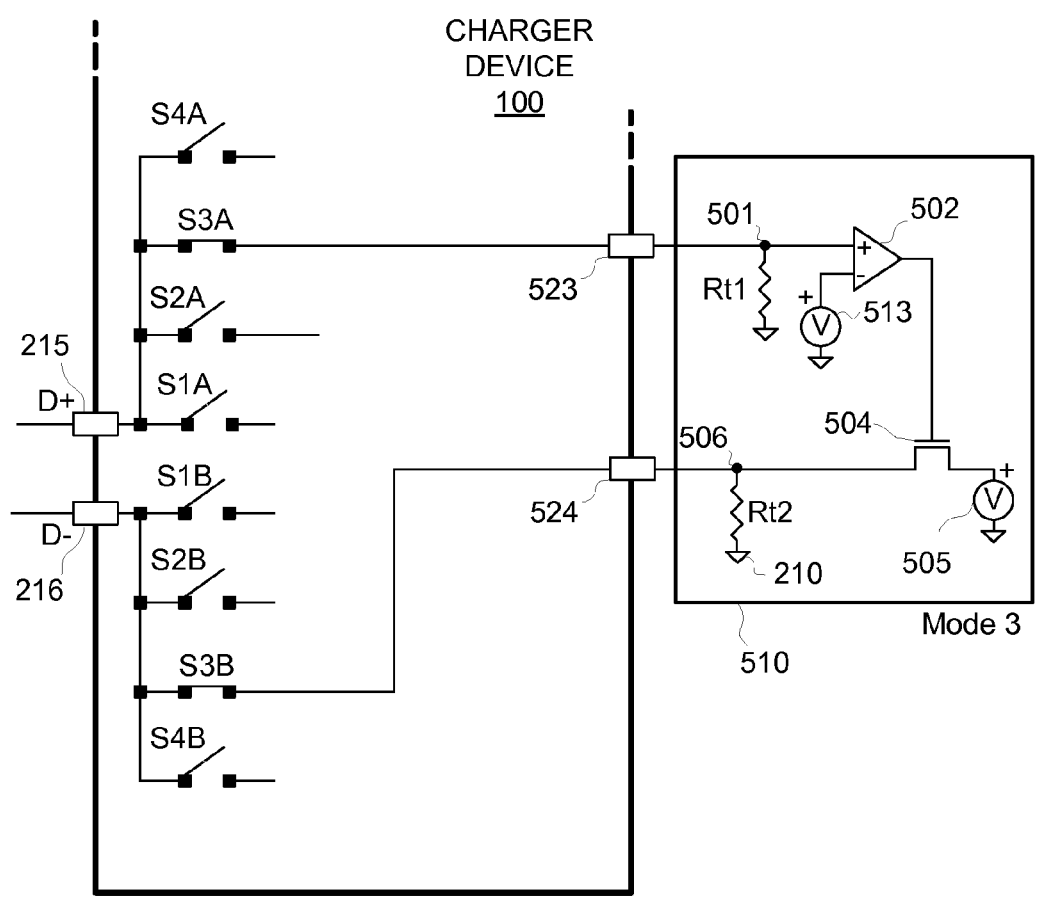
FIG. 5B is a block/circuit diagram depicting an exemplary embodiment of the charger device of FIG. 5A but with an external source voltage circuit.

FIG. 5B is the same as FIG. 5A, except that rather than an internal source voltage circuit 500, an external source voltage circuit 510 is used, namely external to charger device 100. In this embodiment, input pin 501 is coupled to output pin 523 and output pin 506 is coupled to input pin 524, where pins 523 and 524 are of charger device 100 implemented as an IC. Input pin 523 is directly coupled to D+ pin 215 via switch S3A, and input pin 524 is directly coupled to D− pin 217 via switch S3B.

Figure 6A:
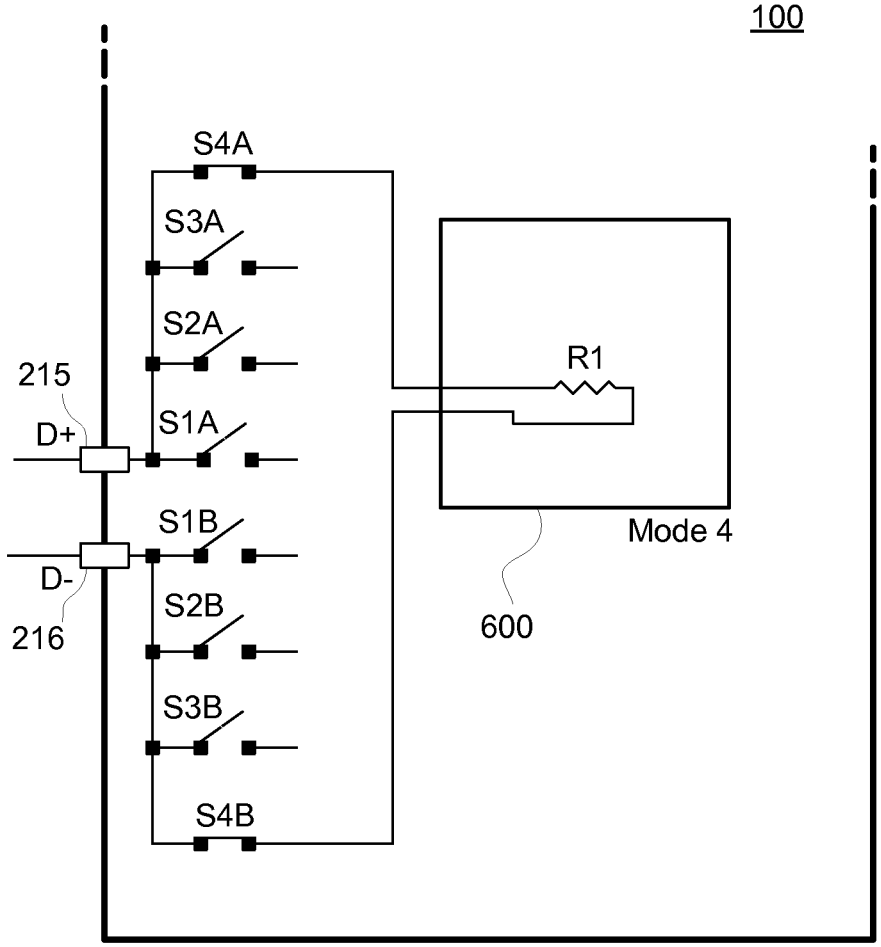
FIG. 6A is a block/circuit diagram depicting an exemplary embodiment of the charger device of FIG. 2 in yet another charging mode.

FIG. 6A is a block/circuit diagram depicting an exemplary embodiment of charger device 100 in Mode 4. In Mode 4, switches S4A and S4B are closed or on, and switches S1 through S3 are all open or off. In Mode 4, a resistor R1 of resistor circuit 600 is directly coupled between switches S4A and S4B, and thus is coupled between D+ pin 215 and D− pin 216. A portable device 103 which is compliant with either or both a dedicated USB charger specification or a USB charger specification in China is charged when such portable device sees an expected resistance associated with resistor R1 across D+ and D− pins of a USB connector 201. For an embodiment, resistor R1 may be in a range of approximately 0 to 200 ohms for providing resistor circuit 600.

Figure 6B:
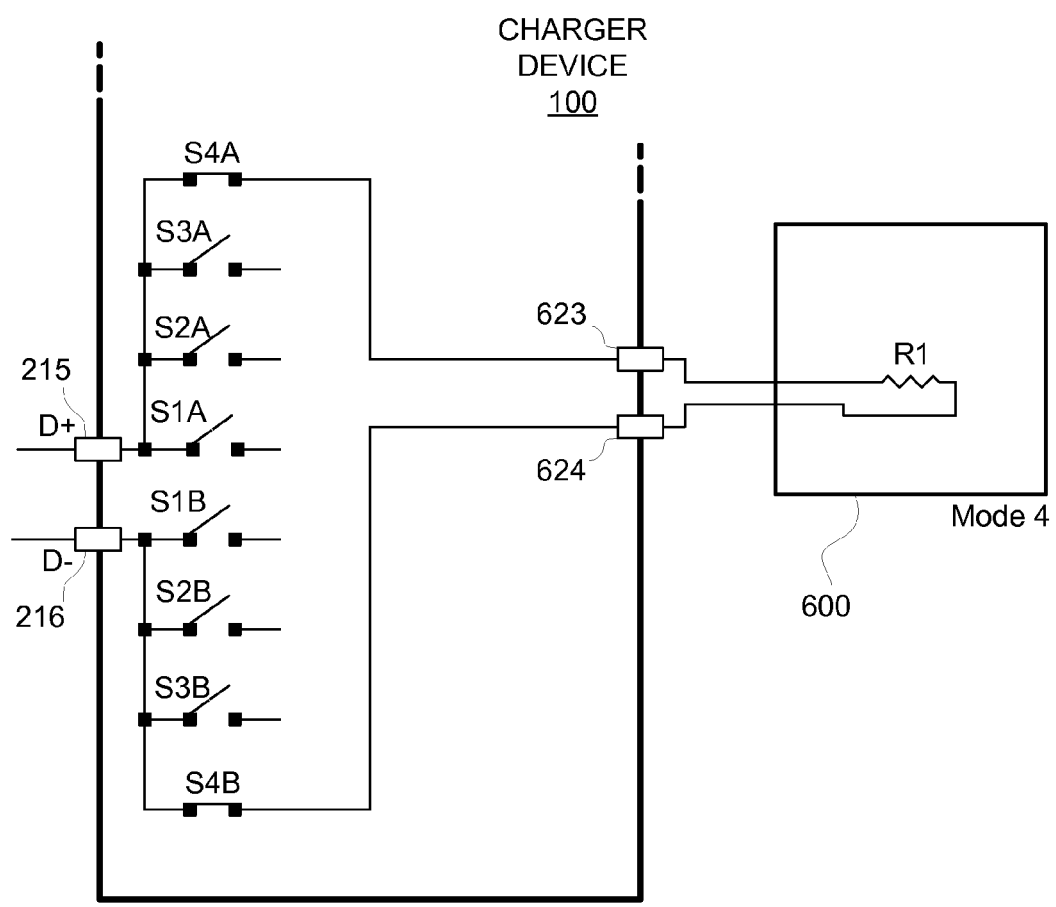
FIG. 6B is a block/circuit diagram depicting an exemplary embodiment of the charger device of FIG. 6A but with an external resistive circuit.

Mode 4 is for portable devices 103 compliant to a dedicated USB charger specification, as described above, and may be used in China as a USB charger compliant to the above-described China USB charger specification. Resistor circuit 600 may be internal to charger device 100 as illustratively depicted in FIG. 6A or may be external to charger device 100 as illustratively depicted in FIG. 6B, where resistor R1 is coupled between pins 623 and 624, and pins 623 and 624 are directly coupled to pins 215 and 216 via switches S4A and S4B, respectively.

With reference to FIGS. 3, 4A, 4B, 5A, 5B, 6A, and 6B, various charging modes as well as data communication modes have been described. It should be understood that it was assumed that bit mapping block 219 of FIG. 2 is for setting switches by pairs S1 through S4 via respective control signals for each of Modes 1 through 4. As described above, this setting may be generally manually done by use of a GUI, BIOS, or electro-mechanical switches, or some combination thereof. In the following description, it shall be assumed that switching of switch module 217 is done based on detection of operating conditions, as described below in additional detail.

Figure 7:
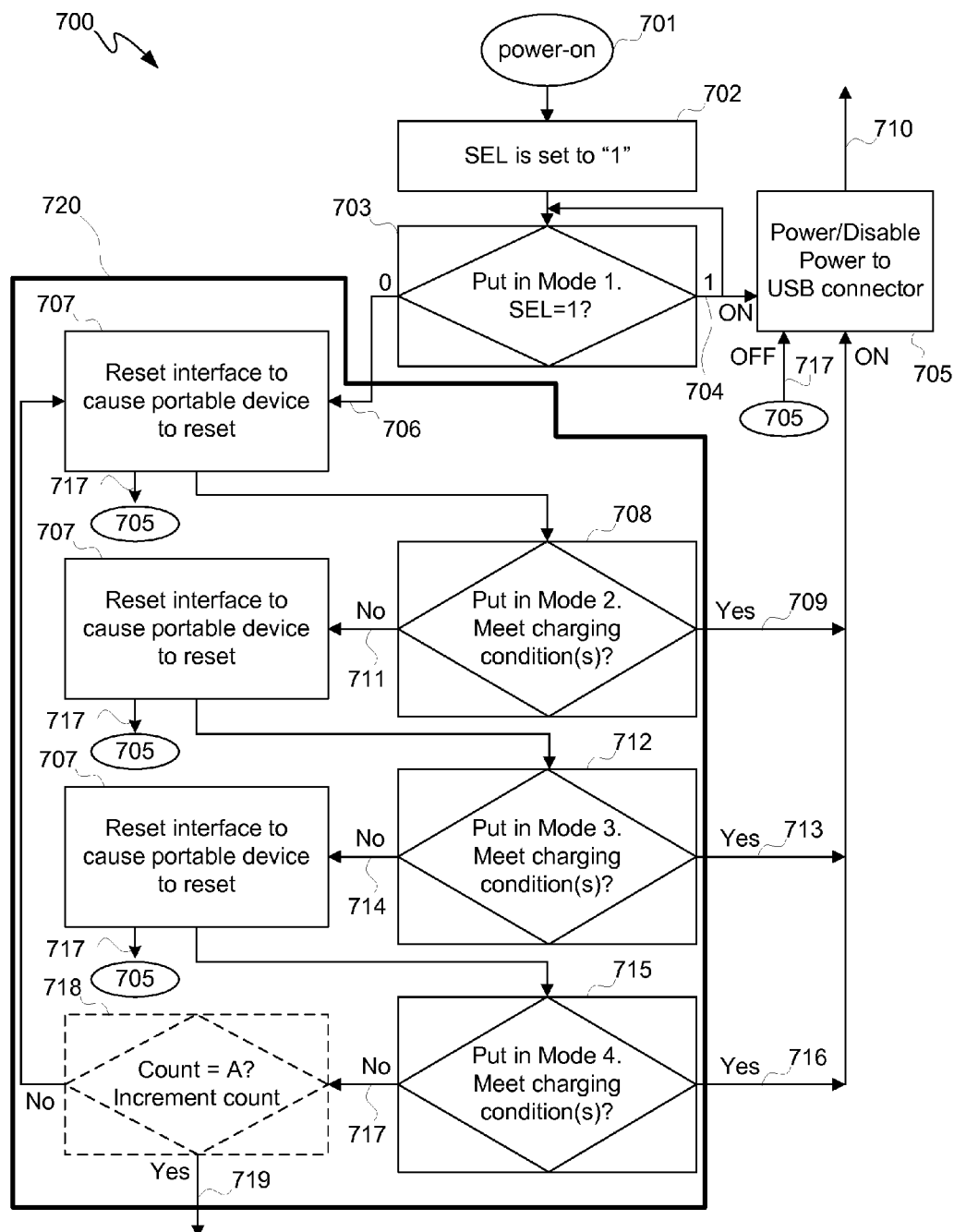
FIG. 7 is a flow diagram depicting an exemplary embodiment of a mode detection flow.

Referring to FIG. 7, there is shown a flow diagram depicting an exemplary embodiment of a mode detection flow 700. Mode detection flow 700 is described for any appliance, computer, or other electronic device having a device charger as described herein. The power source for such electronic device may be grid tied or off-grid, such as a battery supply for example. For purposes of clarity by way of example and not limitation, it shall be assumed that computer 101 is a notebook computer ("NB"). At 701, notebook power is initiated, namely notebook power is on. For an on condition, a select ("SEL") control signal is set to a logic 1 at 702. At 703, a default mode, namely Mode 1, is entered for a power on condition. Mode 1 is a USB port mode for data communication. In such Mode, switches S1 are switched on and switches S2 through S4 are switched off, as previously described with reference to FIG. 2. As long as it is determined at 703 that a control select signal is at a logic high condition, then charging is disabled or not activated and such portable device stays in Mode 1, as generally indicated by arrow 704. For example, for a USB port mode, namely for Mode 1, power is supplied to Vbus pin 202 of FIG. 2, as generally indicated by arrow 704 to power/disable power to USB connector block 705 for providing power to Vbus pin 202 as generally indicated by arrow 710. Furthermore, for example for providing power to a USB connector 201 of FIG. 9 at 705, transistor Q1 is in a substantially conductive state ("on") and transistor Q2 is in a substantially non-conductive state ("off"). However, it should be understood that flow 700 is not limited to the particular embodiment of FIG. 9.

It should be understood that setting of a control select signal to a logic 1 may be determined by a mean power detected for a NB 101 powered on at 701. If such mean power exceeds a threshold or is within a range of a threshold for an operating voltage, then such control select signal may be set to logic 1. If, however, such mean power of NB 101 switched on at 701 is approximately 0 volts or within a range of 0 volts, then such control select signal may be set to logic 0.

If it is determined at 703 that control select signal changes state from logic 1 to a logic 0 as generally indicated by arrow 706, then at 707 a portable device 103 is reset by disabling USB connectivity for approximately 0.1 to 1 second in an embodiment. In such condition, switches S1 through S4 are all switched open or off at 707 to provide a high impedance state of D+ and D− pins of a USB connector, and power transistors Q1 and Q2 are both switched off at 705 as generally indicated by arrow 717 from block 707 to block 705 to provide a high impedance state of a Vbus pin of such USB connector.

Setting a select signal to logic 0 may be triggered by a changing of mode of NB 101 powered on at 701. For example, if NB 101 is in a sleep mode, hibernate mode, or powered down mode, power may still be provided to a charger device and power circuitry as described herein, and thus a charging mode may be entered. Furthermore, such a mode may be entered whether NB 101 powered on at 701 is operating off-grid, such as using battery power for example, or is operating from the power grid, such as being plugged in.

At 708, it is determined whether the charging condition(s) for Mode 2 are met. As described above, the charging conditions for Mode 2 may include reference voltages within respective ranges for entering into a charging state. For determining whether Mode 2 charging conditions are met, switches S1, S3, and S4 are all switched or remain off, and switches S2 are switched on. At 708, the charging condition(s) may be whether a Vref1 and a Vref2 respectively on D+ and D− pins are the correct voltages. Furthermore, if such charging conditions are met for Mode 2 as determined at 708, power is provided to a USB connector by switching transistor Q1 on and leaving transistor Q2 off at 705 as generally indicated by arrow 709 for providing such power to a USB connector as generally indicated by arrow 710. If, however, the charging condition(s) are not met for Mode 2 as generally indicated by arrow 711, then the resetting operation described at 707 is repeated. This sequence may continue for each charging mode until charging condition(s) for a charging mode are detected, and thus that mode is selected as the charging mode.

After repeating operations at 707, at 712 it may be determined whether the charging condition(s) for Mode 3 have been met. With respect to meeting charging conditions at 712, it may be determined whether a host charging is detected, namely whether 0.7 volts appears on each of D+ and D− pins. For determining whether such charging condition(s) have been met for Mode 3, switches S1, S2, and S4 are switched or remain off and switches S3 are switched on at 712. If charging condition(s) for Mode 3 have been met as determined at 712, then power is provided to a USB connector by switching transistor Q1 on and leaving transistor Q2 off at 705 as generally indicated by arrow 713. If, however, charging condition(s) for Mode 3 are not met as determined at 712 as generally indicated by arrow 714, operations at 707 are repeated.

After a repeat of operations at 707, it is determined at 715 whether charging condition(s) for Mode 4 have been met. For a dedicated charger Mode 4, switches S1 through S3 are all left off and switches S4 are switched on. For a dedicated charger mode, transistor Q1 is left off and transistor Q2 is switched on for current sensing to determine whether current on a Vbus 202 is greater than 100 milliamps ("mA"). If it is determined that charging condition(s) for Mode 4 have been met, power is provided to a USB connector by switching transistor Q1 on and switching transistor Q2 off at 705 as generally indicated by arrow 716. If, however, it is determined that charging condition(s) for Mode 4 are not met at 715 as generally indicated by arrow 717, then operations performed at 707 may be repeated once again and the cycle of checking for which charging mode is to be activated may be repeated, namely a repetition of loop 720. Optionally, at 718 a counter may count each iteration of mode searching loop 720 and once a threshold count "A" is reached, as determined at 718, a branch out of such loop may be performed as generally indicated by arrow 719. Such branching out at 719 may be used to trigger a flag, such as a pop-up window to a user, indicating that no mode for charging such portable device 103 coupled to such USB port was identified. Alternatively, another loop 720 for different Modes, namely Modes other than Modes 2 through 4, may be invoked as generally indicated by arrow 719. Accordingly, it should be understood that Modes or groups of Modes may be cycled in a round robin format until charging condition(s) for a Mode match or substantially approximate that of a portable device coupled to a USB connector. Furthermore, the above order of Modes 2 through 4 may though need not be used. For example, Mode 4 may precede Modes 2 and 3 in a round robin format. Accordingly, any order of Modes may be used.

It should be understood that whether from Mode 2, 3, or 4 as generally respectively indicated by arrows 709, 713, and 716, a device charger once in a charging mode stays in such charging mode, until SEL changes state to a logic 1. Thus, a portable device having been put in a sleep mode, a hibernate mode, or a powered-off mode, may continue to receive charge from a charger device until SEL is a logic 1. If such portable device is power cycled back on at 701 or put in an awake mode as generally indicated by SEL going logic high at 702, charge is still provided to a Vbus pin as part of a normal USB data communication protocol, but a charging mode is left when switches associated therewith are switched open at 703 and switches for the normal USB data communication protocol are switched closed at 703.

It should be understood that for each of blocks 708, 712, and 715 there may be a settling time for an associated Mode. So, for example, after a portable device is plugged-in, there is a settling time before a charger device described herein determines whether associated charging conditions are met. This settling time may be affected by the portable device, including without limitation condition of the battery of such portable device or activity of the portable device on the USB interface. Such settling time may be in a range of approximately 1 to 15 seconds.

Figure 8:
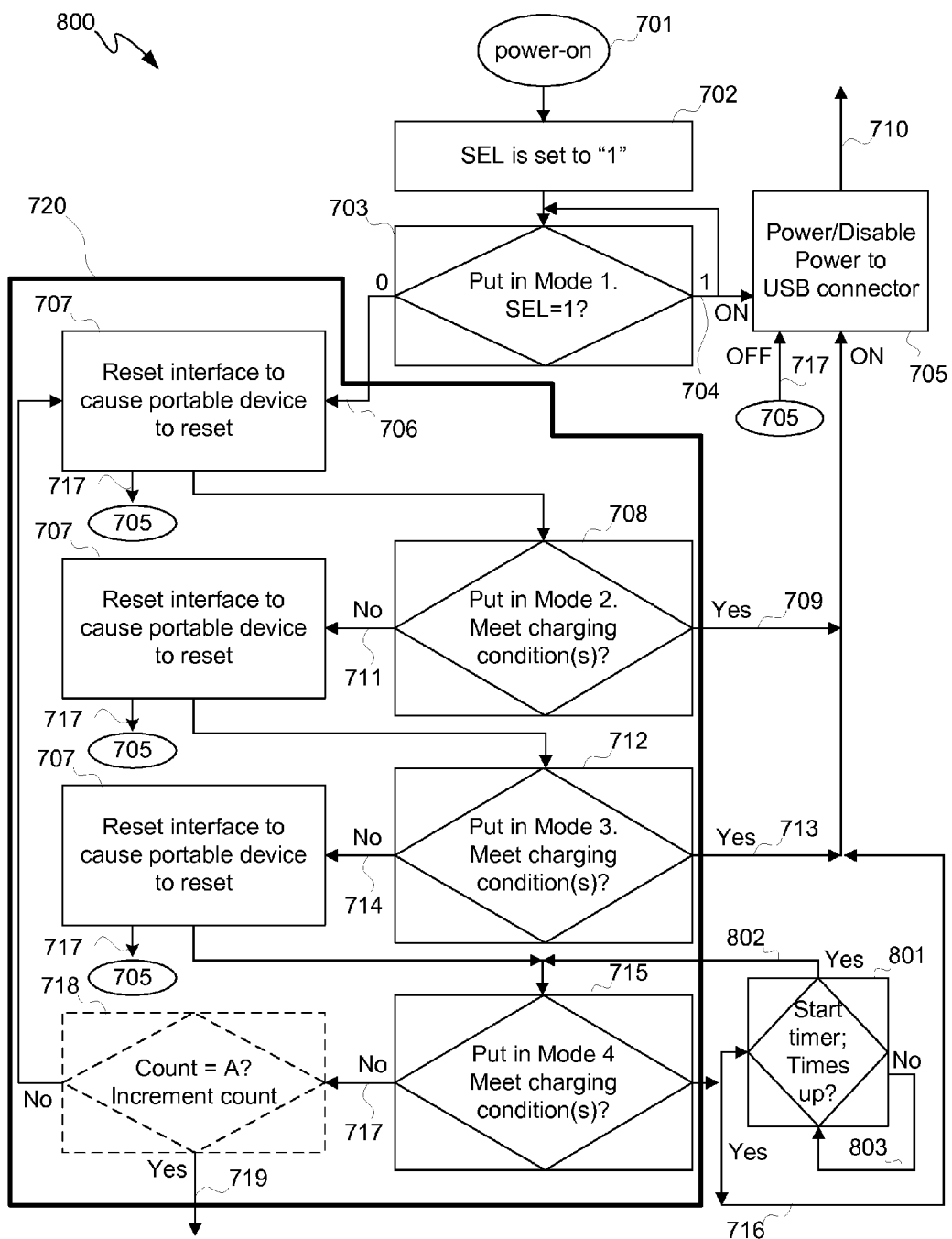
FIG. 8 is a flow diagram depicting another exemplary embodiment of a mode detection flow.

With reference to FIG. 8, there is shown a flow diagram depicting an exemplary embodiment of a mode detection flow 800. Mode detection flow 800 is a variation of mode detection flow 700 of FIG. 7 for a more close relationship to the exemplary embodiment described with reference to FIG. 9. Accordingly, only the differences are described for purposes of clarity.

At 801, assuming that charging conditions for Mode 4 are detected, a timer begins counting at 801. At 801, it is determined whether the counting of the timer has reached a threshold value. The threshold value may be in a range of approximately 30 to 90 seconds, or some other sufficient duration. If at 801 it is determined that a counter has reached the threshold time, then current sensing may be restarted as generally indicated by arrow 802 by returning to operations at 715. If current charging conditions are determined to be for Mode 4, then in addition to initiating a counter at 801, transistors Q1 and Q2 which were respectively off and on for current sensing, are respectively transitioned to on and off at 705 for entering a charging mode. If time is not up at 801, then time checks are periodically made as generally indicated by arrow 803 until a threshold time is reached It should be appreciated that if prior modes, such as Modes 2 and 3, are not detected as being for charging a portable device 103, Mode 4 may be a default charging mode. For Mode 4, it should be understood that generally D+ and D− pins are shorted, but this information does not indicated whether or not a portable device 103 coupled to USB connector 201 is capable of receiving current in a dedicated charger mode. If it is determined that such portable device 103 is drawing current greater than 100 milliamps, such as by measuring or sensing current at 715, then it is assumed that such portable device 103 is in a dedicated charger charging mode. However, in order to ensure that the dedicated charger mode is still invoked, current is periodically re-sensed to ensure that the current drawn is still greater than 100 milliamps.

It should be understood that for sensing and charging, two power MOSFETs, namely Q1 and Q2, may be used for these two separate modes of operation. While it is possible to have only one power MOSFET, this may involve sensing a very small voltage drop, which would add a significant amount of cost. For example, if one power FET for both a sensing mode and a current charging mode were used with a 0.1 ohm sensing resistor is series to Vbus 202 there would be a 100 millivolt voltage drop at 1 amp. This 0.1 volt drop may not be easily detected especially when the current is only 100 milliamps. A charging current of 100 milliamps is common, so 100 milliamps at 0.1 ohm is 10 millivolts. Basically, this would mean measuring or detecting 10 milliamps with an offset of approximately 3 milliamps. While possible, such circuitry may be too expensive to manufacture a cost competitive product.

Figure 9:
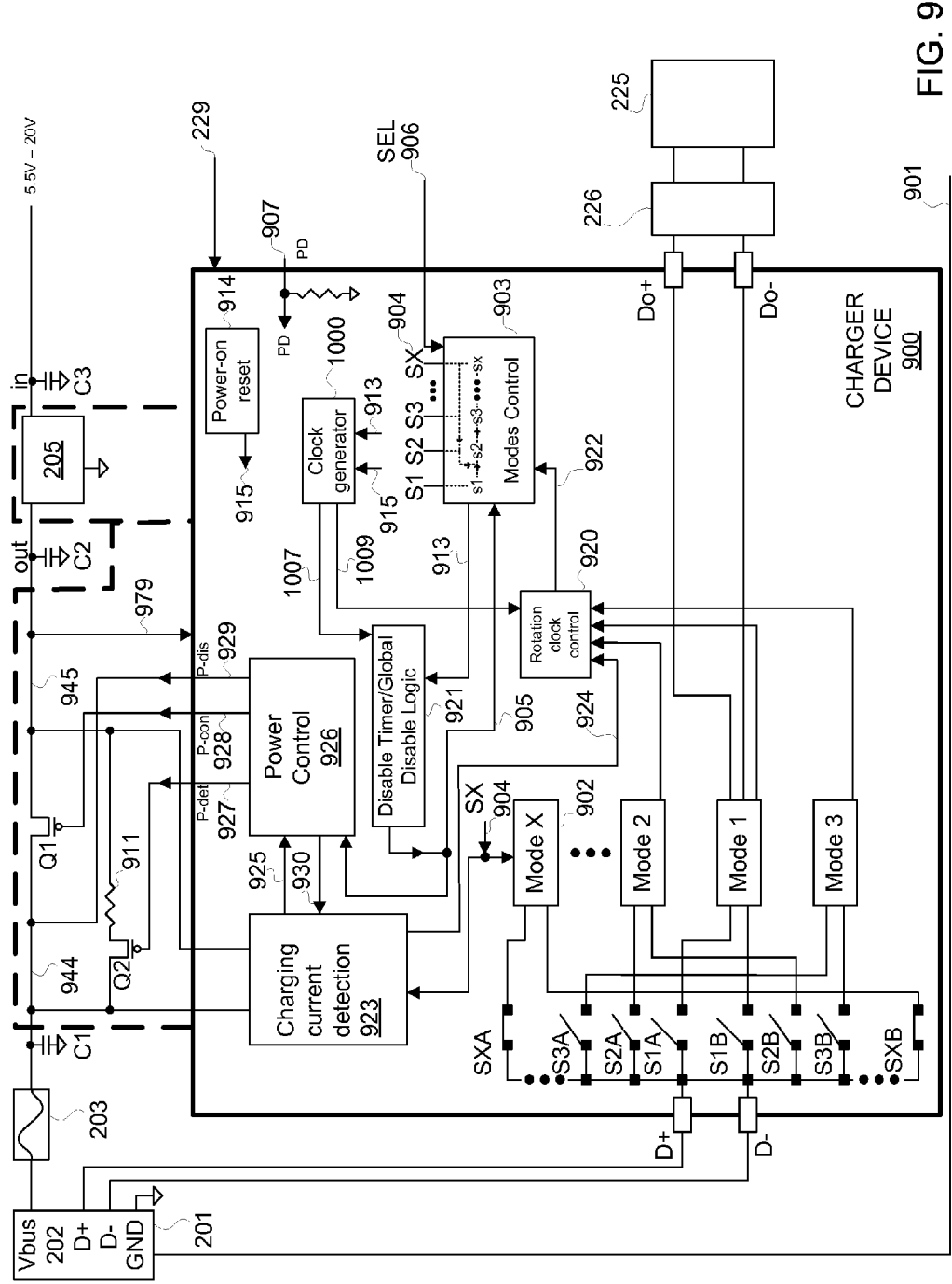
FIG. 9 is a block/circuit diagram depicting another exemplary embodiment of a charger device implemented in a computer.

FIG. 9 is a block/circuit diagram depicting an exemplary embodiment of charger device 900 implemented in a computer 901. Because computer 901 is similar to computer 101 of FIG. 2, same description is not repeated. Additionally, not all components of FIG. 9 are immediately described, as some are described later with reference to other figures.

Charger device 900 is configured for automatically detecting a charging mode of a portable device 103. As generally indicated, there may be more than three modes, as indicated by Mode X block 902, for X a positive integer greater than 3. For Mode X, switches S1 through S3 are open, and switches SXA and SXB are closed for invoking Mode X 902. It also shall be assumed that Mode X 902 is a current sensing mode as previously described. Thus, modes control block 903 provides an SX control signal 904 to mode block X 902. Control signals S1 through SX from modes control block 903 may be respectively provided to mode blocks 1 through X. However, as previously described, only one of such control signals S1 through SX may be active at a time. Furthermore, as previously indicated for a reset mode, all such mode control signals S1 through SX may be globally disabled, such as by a global disable signal 905. For purposes of clarity by way of example and not limitation, it shall be assumed that X equals 4 even though more than four modes may be implemented.

A select signal 906 is a logic 1 when computer 901 is powered on and when computer 901 is not in a sleep or hibernate mode. If computer 901 is in a sleep mode, a hibernate mode, or powered off, select signal 906 is a logic 0. For the powered off mode, it is assumed that charger device 900 may be operated when computer 901 is powered off, namely Vdd 229 is still at a logic high voltage level. Again, it should be appreciated that computer 901 may be a notebook PC, a desktop, or a workstation computer. Furthermore, rather than a computer, a docking station 901 for a notebook PC, a smart phone, or a MP3/MP4 player, among other types of devices having USB capability may be used.

Table 2, indicated below, is a truth table of select signal 906 and power down option signal 907.

TABLE 2

| PD (option) | SEL | Results |
| --- | --- | --- |
| 1 | X | Powered down mode. |
| 0 | 1 | Power-on default. |
| 0 | 0 | Charging modes. |

If power down option signal 907 is logic high, charger device 900 is powered down and select signal 906 is a don't care; this is referred to as a powered down mode for charger 900. If, however, a power down option is not invoked as indicated by power down option signal 907 being a logic 0, and if select signal 906 is a logic 1 indicating that computer 901 is powered on, then a power-on default mode is invoked. In a power-on default mode, data communication, namely Mode 1, is invoked for a USB port, which may be any of USB 1.1, 2.0, or 3.0. Lastly, if powered down option is not invoked as indicated by power down option signal 907 being a logic low and select signal 906 being a logic low indicating that computer 901 is in a sleep, hibernate, or powered down mode, then this is a charging mode or at least a charging mode opportunity window.

Charger device 900 in such a charging mode rotates between different charging modes, such as in a round robin format, generally until a compatible charging mode is detected for charging a portable device. It should be further understood that select signal 906 may be a logic low even though computer 901 is powered on and is not in a hibernate or sleep mode. In such a condition, such a charging mode may still be invoked when a USB data communication mode, namely Mode 1, is not invoked.

Table 3, below, indicates status of select signal 906 for each internal mode status control signal S1 through S4 in this example for purposes of comparison with Table 1.

TABLE 3

| Internal modes control signals status | | | | | |
|---|---|---|---|---|---|
| S1 | S2 | S3 | S4 | SEL | |
| 1 | 0 | 0 | 0 | 1 | Mode 1 (e.g., USB 1.1, 2.0, or 3.0) |
| 0 | 1 | 0 | 0 | 0 | Mode 2 (e.g., voltage-reference-requested-portable-devices charger) |
| 0 | 0 | 1 | 0 | 0 | Mode 3 (e.g., host charger) |
| 0 | 0 | 0 | 1 | 0 | Mode 4 (e.g., dedicate charger or China charger) |
| 0 | 0 | 0 | 0 | X | Mode 0 (to cause a portable device to reset) |

Thus, for select signal 906 being a logic high, Mode 1 may be invoked, namely a pass through mode for passing data to and/or from USB connector 201 and USB controller 225. For Modes 2 through 4, select signal 906 is logic 0, such as when a charging mode is invoked. Lastly, there is no separate mode block for Mode 0. This is because Mode 0 is more of a transitory mode for entering Modes 1 through 4 for example. Mode 0 is for causing a portable device to reset itself. Mode 0 may be as previously described at 707 with reference to FIG. 7, and in Mode 0, select signal 906 is a don't care.

Charger device 900 may be implemented without use of a GPIO, GUI, or BIOS control. A select signal 906 may be coupled to Vdd and ground of computer 901. Thus when computer 901 is powered on, select signal 906 may be raised to a logic 1, and select signal 906 may be set low for a charging mode. Furthermore, when computer 901 is powered off, or is put into a sleeping mode or hibernate mode, select signal 906 may be set to logic low, namely once select signal 906 is toggled to ground 210. Charger device 900 thus may automatically go into detection and control for charging when select signal 906 is toggled to ground 210.

Responsive to global disable signal 905 being asserted from disable timer/global disable logic 921 to modes control block 903 and power control block 926, modes control block 903 may be configured to assert a global reset signal 913 to disable timer/global disable logic 921. Power-on reset block 914 may be configured to assert a power-on reset signal 915. Power-on reset signal 915 may be provided to clock generator 1000 in addition to global reset signal 913. Charger device 900 may be coupled to Vdd 229 as previously described. For purposes of clarity by way of example and not limitation, it shall be assumed that Vdd is 3.3 volts; however, it shall be appreciated that higher or lower voltage values may be used for Vdd, as is known. Charger device 900 may receive a Vdd voltage higher than Vdd 229 from node 945 as generally indicated by arrow 979. For example, Vdd 979, which may be 5 volts or higher for example, may additionally be provided to charger device 900.

Alternatively, power MOSFETs, such as PMOS transistors Q1 and Q2, as well as resistor 911, may be formed as part of the same IC as charger device 900. Yet in another alternative embodiment, transistors Q1 and Q2 may be formed as part of the same IC as charger device 900, and resistor 911 may be externally coupled to such IC. Still in yet another alternative embodiment, power block 205 may be formed in the same IC as charger device 900, or power block 205, transistors Q1 and Q2, and resistor 911 may be formed as a separate semiconductor die such as for packaging as a multi-chip or multi-die module with an IC used to provide charger device 900. Even further still in such multi-chip module embodiment, power block 205 and transistors Q1 and Q2 may be formed as a separate semiconductor die and resistor 911 may be externally coupled thereto.

FIG. 10A is a circuit diagram depicting an exemplary embodiment of clock generator 1000. FIG. 10B is a circuit diagram depicting an exemplary embodiment of power-on reset circuit 914. Again, even though specific numerical values are provided for purposes of clarity by way of example and not limitation, it should be appreciated that these or other numeric values may be used. With simultaneous reference to FIGS. 9, 10A, and 10B, charger device 900 is further described.

Resistors 1001 and 1002, such as a 500K and a 30K ohm resistor, respectively, along with capacitor 1003, which may be a 2.2 microfarad capacitor, and inverters 1004 and 1005 may be coupled to provide a clock signal 1015 of approximately 16 hertz. Such clock signal may be used to clock D flip-flops of clock generator 1000. Flip-flops 1099 of clock generator 1000 progressively countdown frequency of clock signal 1015. The first four flip-flops of flip-flops 1099 countdown clock signal 1015, from oscillator 1020 down to a one hertz clock signal 1007. The first seven of flip-flops 1099 further countdown clock signal 1015 down to a clock signal 1009, namely approximately a 0.1 hertz clock signal. All flip-flops 1099 further countdown clock signal 1015 to a clock signal 1011, namely approximately a 0.015 hertz clock signal. Thus, three output clock signals 1007, 1009, and 1011, may be generated by clock generator 1000. Fewer or more flip-flops may be used for other clock signal increments. Additionally, taps of such clock signals may be taken from different locations from those described herein.

Flip-flops or registers 1099 may all operate off of Vdd 229 and may be coupled to be preset via Vdd 229 by a preset ("/PRE") signal. Global reset signal 913 may be provided to an input of AND gate 1022 along with power-on reset signal 915 and reset signal 1021 which are provided to inverted inputs of AND gate 1022. Output of AND gate 1022 may be used as a clear signal ("/CLR") for providing to flip-flops 1099. It should be understood that /CLR and /PRE signals are negative logic, namely asserted when logic is 0.

Power-on reset circuit 914 includes resistor 1030 coupled to Vdd 229 and to node 1031. Power-on reset circuit 914 further includes capacitor 1032 coupled between node 1031 and ground 210. Lastly, power-on reset signal 914 includes inverter 1033 having its input coupled to node 1031 and its output for providing power-on reset signal 915 to AND gate 1022.

With reference to FIG. 10C, Vdd is illustratively shown ramping up generally along slope 1040 to a Vdd high logic level 1045. Generally, once Vdd initially reaches logic high Vdd level 1045, a pulse of power-on reset signal 915 is triggered by power-on reset circuit 914, as generally indicated as pulse 1046.

Clock generator 1000 provides clock signal 1009 to rotation clock control block 920, and clock generator 1000 provides clock signal 1007 to disable timer/global disable logic ("disable timer") 921. Assuming for purposes of clarity and not limitation that X is equal to 4 for this embodiment, then if Mode 4 is the only charging mode of all modes of charger device 900 that uses a current detection function, then if a valid charging current is not detected in Mode 4, clock rotation by rotation clock control block 920 and mode control by modes control block 903 cause a rotating back to an initial mode for a sequence of detecting mode, namely Mode 2 as previously described with reference to FIGS. 7 and 8. Rotation clock control block 920 may thus assert a rotating control signal 922 for providing a modes control block 903 for sequentially rotating each pair of switches S2 through S4 for detecting a charging mode.

Charging current detection block 923, which is coupled to node 944 of an IV bus associated with Vbus pin 202, is used to sense current on node 944. Node 945 is an output node of power block 205. If a valid charging current is not detected or sensed, then charging current detection block 923 asserts a rotating to Mode 2 control signal 924 to rotation clock control block 920. Control signal SX 904 from modes control block 903 is provided to Mode X block 902 and to charging current detection block 923 to activate a current sensing mode.

Disable timer 921 may be for asserting an approximately 0.1 to 1 second disable duration as previously described. Again, for purposes of clarity by way of example and not limitation, it shall be assumed that Mode 4 is the charging mode that uses a current detection function. Charging current detection block 923 is configured to measure charging current of IV bus, namely current on node 944 going toward Vbus pin 202 of connector 201, for a condition to determine if a portable device 103 with a dedicated China charger mode is plugged into connector 201. In Mode 4, S4 or SX is a logic high. A logic high for SX 904 prevents asserting of rotating to Mode 2 control signal 924 and may be used for assertion of charging control signal 925.

Charging control signal 925 from block 923 is provided to power control block 926. Power control block 926 is configured to assert power detect signal 927, power connect signal 928, and power disable signal 929. Additionally, power control block 926 is configured to assert re-detect signal 930.

In a sensing mode, transistor Q1, which in this embodiment is a PMOS transistor, is off and transistor Q2, which in this embodiment is a PMOS transistor, is on. Alternatively, NMOS power FETs may be used. Accordingly, nodes 944 and 945 are electrically decoupled from one another by transistor Q1. In a sensing mode, transistor Q2 is on, and power detect signal 927 is logic low. Charging current detection block 923 is coupled to sense current on nodes 944 and 945. Transistor Q1 has source and drain nodes respectively coupled to nodes 944 and 945 and has its gate coupled to receive power control disconnect signal 928 from power control block 926. In a sensing mode, power connect signal 928 is logic high. Node 944, which is located between fuse 203 and a drain node of transistor Q1, is coupled to a drain node of transistor Q2, as well as coupled to charging current detection block 923 for sensing current. Transistor Q2, which has its gate coupled to receive power detect signal 927 from power control block 926, has its source coupled to node 945 via a sense resistor 911. Additionally, node 945 is coupled to charging current detection block 923 for sensing current.

Figure 11:
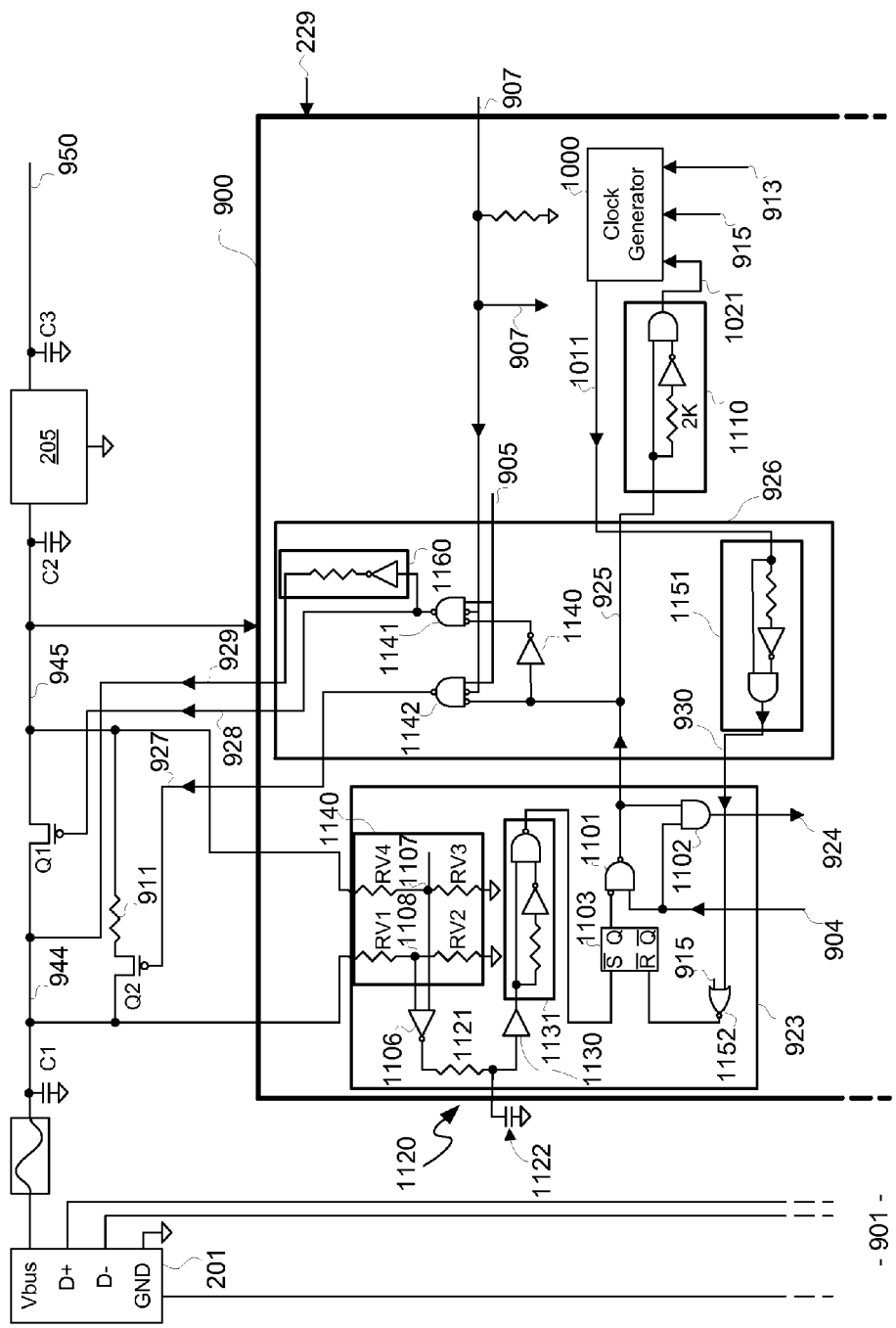
FIG. 11 is a block/circuit diagram depicting exemplary embodiments of a charging current detection block, a power control block, and a reset generator circuit for the charger device of FIG. 9.

FIG. 11 is a block/circuit diagram depicting exemplary embodiments of an implementation of charging current detection block 923, a power control block 926, and a reset generator circuit 1110. Once again, particular numerical examples are provided for purposes of clarity by way of example and not limitation, and thus it should be appreciated that values other than those specifically described may be used as may vary from application to application. At power on, power on reset signal 915 resets output Q of register 1103 of block 923. This reset causes Q output of register 1103 to be logic low to indicate a power on default status. Output of Q register 1103 is provided to an inverted input of NAND gate 1101, which is a logic low for Q output of register 1103 a logic low. This means that transistor Q1 is in an off state and transistor Q2 is an on state. In these states, Mode 4 is in a current sensing mode for a power on default condition.

SX signal 904 is logic high when Mode 4 is invoked. Thus, NAND gate 1101 and AND gate 1102 of charging current detection block 923 allow a detected current result output from register 1103 to control states of transistors Q1 and Q2, as well as control whether rotating to Mode 2 control signal 924 is asserted.

When an IV bus, namely when node 944, is approximately 0 amps, a voltage drop on sensing resistor 911 is approximately 0 volts. The resistance ratio determined by voltage dividers 1140, respectively coupled to nodes 944 and 945, generate voltages references at nodes 1108 and 1107, respectively. The voltage divider formed by resistors RV1 and RV2 is coupled to node 944 for node 1108 between such resistors, and the voltage divider created by resistors RV4 and RV3 has a node 1107 between them. Nodes 1107 and 1108 are respectively coupled to minus and plus inputs of differential inverter 1106. It should be understood that for more variability in selecting resistors RV1 through RV4 for setting up reference voltages, such resistors may be coupled externally to charger device 900, though not illustratively shown for purposes of clarity and not limitation. If voltage at node 1108 is greater than voltage at node 1107, a DC offset of nodes 1108 and 1107 is within a working range of differential inverter 1106. Additionally, it should be appreciated that for additional variability to the operational range of differential inverter 1106, differential inverter 1106 may be external to charger device 900.

For voltage at node 1108 being higher than voltage at node 1107, output of differential inverter 1106 is a logic low. If, however, IV bus node 944 exceeds a 100 milliamp current or some other threshold current level, voltage at node 1107 is higher than voltage at node 1108. Accordingly, output of differential inverter 1106 may transition from a logic low to a logic high state.

Figure 12:
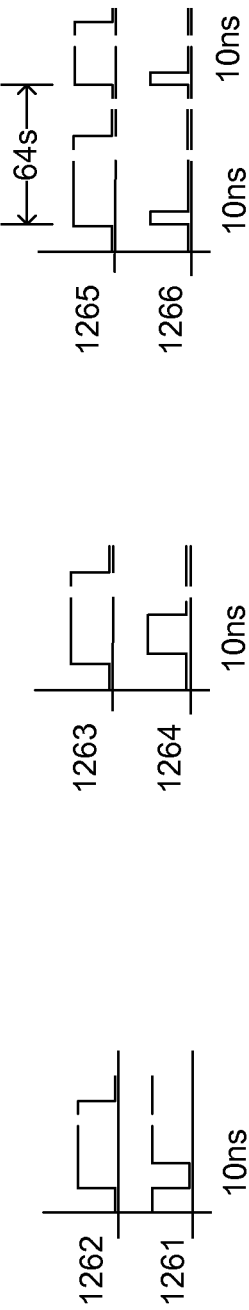
FIGS. 12A through 12C are respective signal diagrams depicting exemplary embodiments of pulsed inputs and outputs for the charging current detection block, the reset generator circuit, and the power control block, respectively, of FIG. 11.

Output of differential inverter 1106 is provided to an "inrush" filter 1120 formed of resistor 1121 and capacitor 1122. In-rush filter 1120 may be used to mitigate against any disturbance from an "in-rush" of current caused by discharge of one or both of bypass capacitors C1 and C2. In this embodiment, capacitor 1122 is approximately 4.7 microfarad capacitor with a 200 millisecond discharge time. Output of in-rush filter 1120 is provided to buffer 1130. Output of buffer 1130 is provided to pulse generating circuit 1131. In this particular embodiment, the resistor of pulse generating circuit is approximately 2K ohm for generating a 10 nanosecond ("ns") low pulse as generally indicated in FIG. 12A. For input 1262 to pulse generating circuit 1131, output 1261 may be obtained therefrom as generally indicated in FIG. 12A. Such pulse from pulse generating circuit 1131 may be used to set output Q of register 1103 to a logic high state. Output of NAND gate 1101 which passes the value output from register 1103 will be a logic high. Thus, charging signal 925 provided to power control block 926 is logic high, which after inversion by inverter 1140 and then provided to an inverted input port of NAND gate 1141 causes output from NAND gate 1141 to be logic low. Furthermore, charging signal 925 is provided to an inverted input port of NAND gate 1142 and output of NAND gate 1142 is a logic high. Accordingly, transistor Q1 is switched on and transistor Q2 is switched off for transitioning from a sensing mode to a charging mode.

To prevent charger device 900 from being stuck in a charging mode without doing any subsequent sensing, reset circuit 1110 receives charging signal 925 for generating a reset signal 1021. Reset circuit 1110 outputs reset signal 1021 to clock generator 1000. This causes clock generator 1000 to count for some period of time. For this embodiment the count is for 64 seconds; however, other durations of counting may be used. After the duration of such count has lapsed, a rising edge from clock signal 1011 of clock generator 1000 passes through reset circuit 1151, to assert re-detect signal 930. Reset circuit 1151 forms part of power control block 926. Re-detect signal 930 is provided as an input to NOR gate 1152 of charging current detection block 923. Another input of NOR gate 1152 is power-on reset signal 915. Output of NOR gate 1152 is provided to a reset port of register 1103. Accordingly, register 1103 of charging current detection block 923 may be reset such that output on a Q port thereof is set to logic low for resuming a current sensing mode.

FIG. 12B depicts an exemplary embodiment of an input 1263 for reset circuit 1110 and an associated output at 1264 of reset circuit 1110.

FIG. 12C is a signal diagram depicting an exemplary embodiment of pulses. More particularly, pulses 1265 indicates input to reset circuit 1151, and pulses 1266 indicate output of reset circuit 1151 in response to input pulses 1265. If charging current is higher than 100 milliamps or some other current threshold level is not detected, then register 1103 outputs a logic low which activates, or more particularly it causes assertion of clock rotation control signal 924 for rotating into Mode 2.

It should be understood than when resistance of sense resistor 911 is relatively high, such as in a range of one to two ohms, or some other applicable resistance, which is relatively substantially larger than a 0.1 ohm sense resistance, such higher resistance generates a higher voltage drop. A higher voltage drop allows differential inverter 1106 to detect a relatively small charging current, such as 100 milliamps for example. If a substantially higher resistance for sense resistor 911 were used, namely substantially higher than two ohms for example, there may be too much voltage drop for a relatively high charging current. For example, a two ohm resistance at one amp will cause a two volt drop which would be generally too large for a normal charging operation. Accordingly, transistors Q1 and Q2 are switched between sensing and charging modes. Thus, when Q2 is on, Q1 is off, and when Q1 is on, Q2 is off. The relative "on" or conductive resistance of either Q1 or Q2 is generally less than 0.1 ohms. Thus it should be appreciated that a relatively small sensing resistor 911 may be used and that switching form sensing to charging modes avoids such resistor 911 from being burnt up. Furthermore, it should be appreciated that if resistor 911 were substantially smaller, then cost of differential inverter 1106 would substantially greater for sensing small voltage differences, as previously described.

As previously described, global disable signal 905 may be asserted from approximately 0.1 to 1 seconds as a low pulse from disable timer/global disable logic ("disable timer") 921. Such global disable signal 905 may be responsive to a low pulse from disable timer 921 having this duration. Accordingly, each time for switching between modes, such global disable signal 905 may be asserted for such duration. Responsive to assertion of global disable signal, output of NAND gate 1141 and output of NAND gate 1142 are both logic high for putting both of transistors Q1 and Q2 into off states. With both transistors Q1 and Q2 in off states, or generally disabled, a portable device may be reset to re-detect status of D+ pin 215 and D− pin 216. Optionally, during the global disable period in order to ensure that Vbus 202 reaches 0 volts for a complete or proper reset, power disable circuit 1160 asserts power disable signal 929 for outputting a logic low for discharging capacitor C1 while transistor Q1 is in an off state. Input of power disable circuit 1160 receives output of NAND gate 1141, and output of power disable circuit 1160 is coupled to node 944. Capacitor C1 is coupled between ground 210 and node 944.

Figure 13:
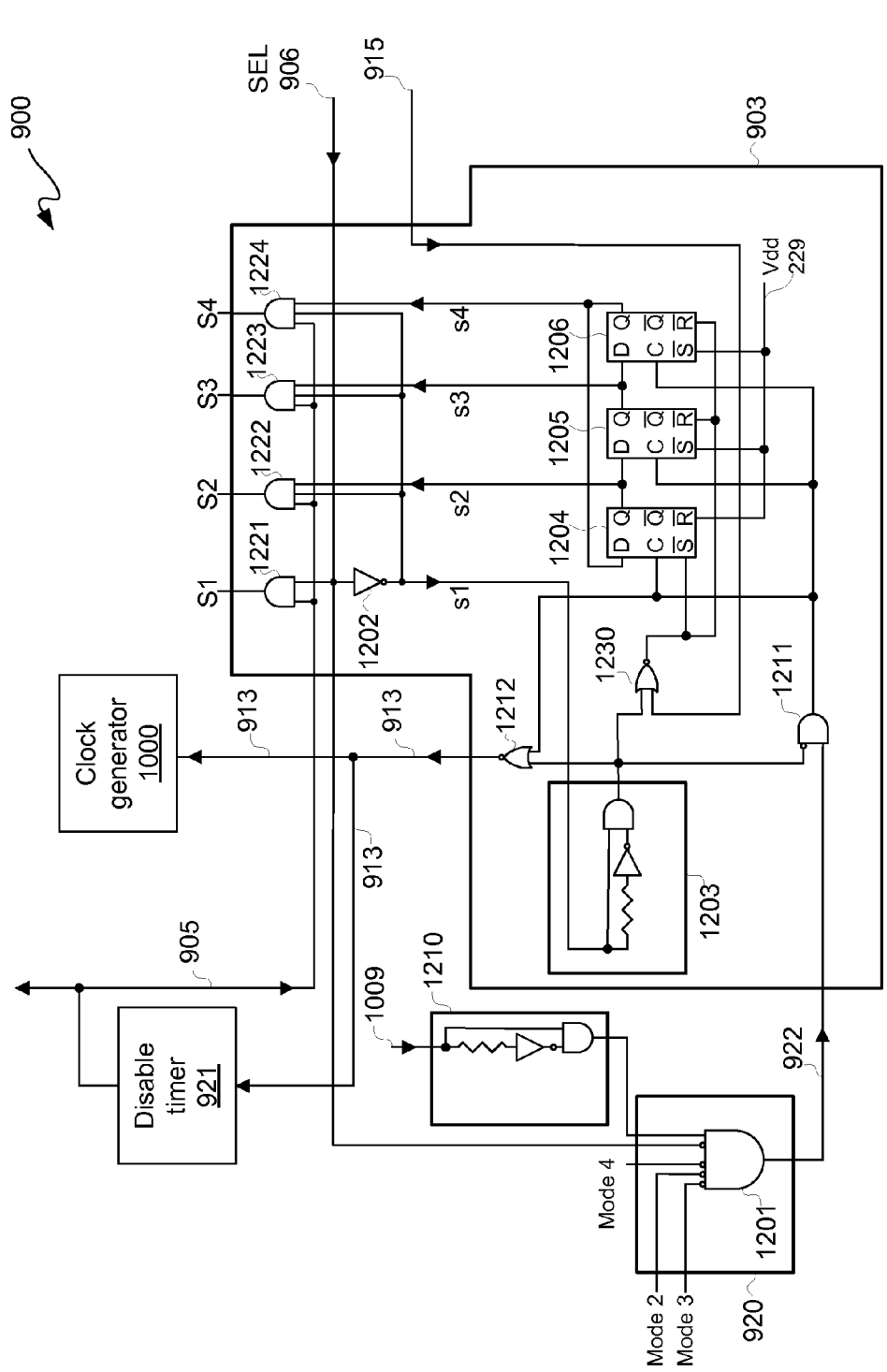
FIG. 13 is a block/circuit diagram depicting an exemplary embodiment of a modes control block and other circuitry of the charger device of FIG. 9.

FIG. 13 is a block/circuit diagram depicting an exemplary embodiment of modes control block 903 and other circuitry which may be used for charger device 900 of FIG. 9. When SEL signal 906 is a logic 1 for Mode 1, namely data communication USB mode, signals from modes 2, 3, and 4 to respective inverted input ports of AND gate 1201 of rotation clock control block 920 are all logic lows. Output from AND gate 1201 is thus for a default except that SEL signal 906 input to an inverted input port of AND gate 1201 disables rotating control signal 922. Furthermore, when SEL signal 906 is a logic high, SEL signal 906 causes switches of switch pair S1 to be switched on and switches of switch pairs S2 through S4 to be switched off via inverter 1202.

If SEL signal 906 transitions from a logic 1 to a logic 0, namely initially going to Mode 2, output from inverter 1202 provided to reset circuit 1203 causes such reset circuit to output a logic high pulse. For this exemplary embodiment, such pulse is a 10 nanosecond pulse; however, other pulse durations may be used. Such pulse duration may be caused by propagation delay from a resistor and an inverter of such reset circuit 1203. Such pulse from reset circuit 1203 causes registers 1204, 1205, and 1206, that provide control signal outputs for s2, s3, and s4, respectively, to respectively have output values 1, 0, 0. Accordingly, values in such state for control signals S1, S2, S3, and S4 are respectively 0, 1, 0, 0, respectively, as output from AND gates 1221 through 1224.

High pulses of clock signal 1009 go through reset circuit 1210 to generate a 10 nanosecond pulse. Again, these numerical examples may be changed and these or other pulse durations may be used. Output of reset circuit 1210 is provided to an input port of AND gate 1201, output of which is used for rotation of bits or bit shifting from registers 1204 through 1206.

Table 4 below indicates sequential positions of clock signal 1009 and corresponding states of control signals s1 through s4.

TABLE 4

| CLK (K) | s1 | s2 | s3 | s4 |
| --- | --- | --- | --- | --- |
| Initial | 0 | 1 | 0 | 0 |
| At rise | 0 | 0 | 1 | 0 |
| At rise | 0 | 0 | 0 | 1 |
| At rise | 0 | 1 | 0 | 0 |

AND gate 1211 is coupled to receive the output of reset circuit 1203 as an inverted input, and the output of AND gate 1211 is provided as a clock signal to registers 1204 through 1206 and as an input to NOR gate 1212. Another input to NOR gate 1212 is output of reset circuit 1203. AND gate 1211 is to mitigate against any disturbance from output of AND gate 1201 when output of an AND gate of reset circuit 1203 outputs a high pulse.

If select signal 906 changes from a logic low to a logic high state, namely returning to Mode 1, a logic high select signal disables output of AND gate 1201. Such disabling of the output of AND gate 1201 stops clock rotation, namely rotation of modes via registers 1204 through 1206. In such a mode, control signals S1 through S4 have states corresponding to 1, 0, 0, 0, as respectively output from AND gates 1221 through 1224.

Each of AND gates 1221 through 1224 receives a global disable signal 905 from disable timer 921 as one input. AND gate 1221 receives select signal 906 as another input and AND gates 1222 through 1224 receive select signal 906, after inversion by inverter 1202, as other inputs. Additionally, control signals s2 through s4 are respectively provided as inputs to AND gates 1222 through 1224. For each 10 nanosecond high pulse from reset circuit 1203 and AND gate 1211, NOR gate 1212 outputs a 10 nanosecond low pulse as global reset signal 913. Assertion of global reset signal 913 is used to trigger disable timer 921 for generation of a 64 second low pulse of global disable signal 905 to set high impedance of Vbus pin 202, D+ pin 213, and D− pin 214 of USB connector 201. This high impedance state of pins 202, 213, and 214 causes a portable device 103 coupled to connector 201 to be reset for re-detecting state of D+ and D− pins. Global reset signal 913 further resets clock generator 1000.

Power-on reset signal 915 is provided to NOR gate 1230, the other input to NOR gate 1230 is output of reset circuit 1203. Output of NOR gate 1230 is used to set register 1204 and to reset registers 1205 and 1206. Registers 1205 and 1206 are set using Vdd 229, and registers 1204 is reset using Vdd 229. Thus, control signals s1 through s4 may be respectively set to 1, 0, 0, 0 for a power-on default condition when computer 901 is powered on.

Figure 14:
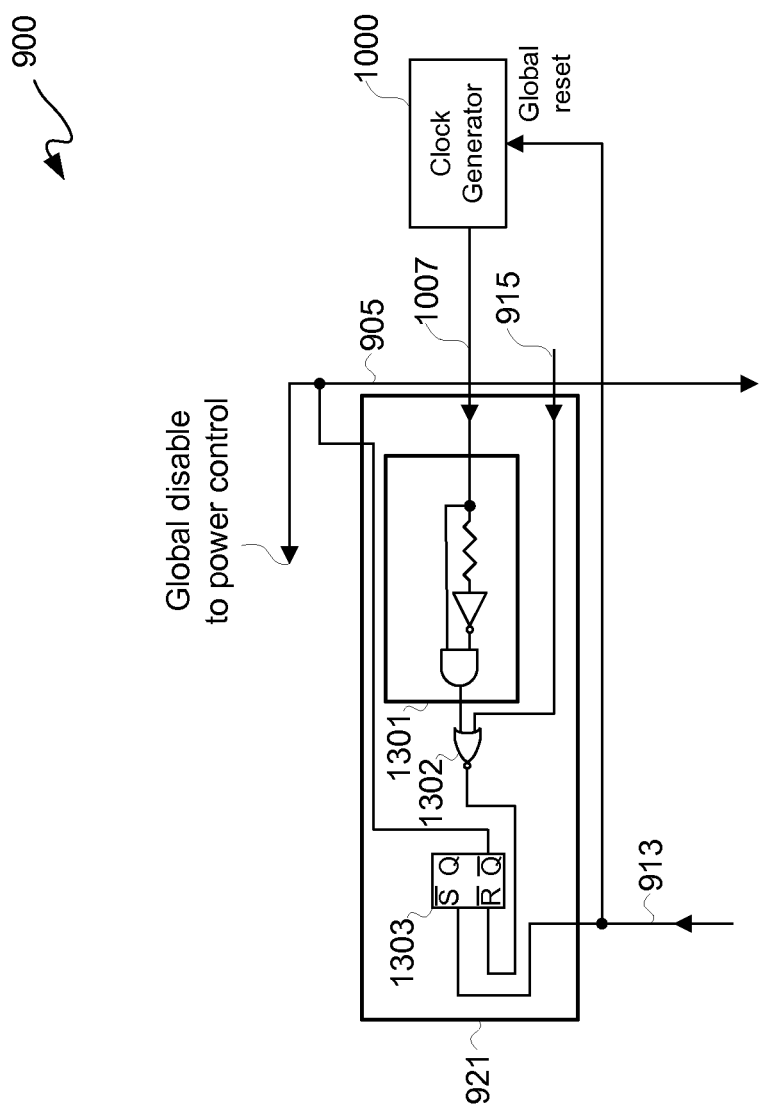
FIG. 14 is a block/circuit diagram depicting an exemplary embodiment of a disable timer coupled to a clock generator of the charger device of FIG. 9.

FIG. 14 is a block/circuit diagram depicting an exemplary embodiment of disable timer 921 coupled to clock generator 1000 of charger device 900. Disable timer 921 and clock generator 1000 receive global reset signal 913. Power-on reset signal 915 is provided to disable timer 921. Clock generator 1000 provides clock signal 1007 to disable timer 921. Disable timer 921 includes reset circuit 1301, NOR gate 1302, and register 1303.

Clock signal 1007 is provided as an input to reset circuit 1301. Reset circuit 1301 is configured to generate a pulse, and such pulse is output from reset circuit 1301 as an input to NOR gate 1302. Another input to NOR gate 1302 is power-on reset signal 915.

Disable timer 921 disables, namely provides a high impedance, on D+, D−, and Vbus pins of USB connector 201. Again, the duration of such high impedance state may be from approximately 0.1 to 1 second, or some other time interval, prior to entry into a Mode through a rotation, as previously described. Accordingly, disable timer 921 may be used to mimic re-plugging of a portable device 103 into connector such as to connector 201, as previously described. Such resetting of such a portable device 103 causes such portable device to re-detect status on D+ and D− pins for a different mode, such as going from a data communication mode to a charging mode, or vice versa.

A pulse from clock signal 1007, which again in this example embodiment is a one second duration input to reset circuit 1301, is used to generate a 10 nanosecond pulse from reset circuit 1301. Global reset signal 913 may be a negative 10 nanosecond pulse provided to a set port of register 1303, and output from NOR gate 1302 may be provided to a reset port of register 1303. A /Q output of register 1303 may be used for sourcing global disable signal 905. Thus, a negative 10 nanosecond pulse input via global reset signal 913 at the start of a mode rotation, after processing by disable timer 921, sets /Q output from register 1303 as a one second duration negative pulse. In other words, each 10 nanosecond low pulse of global reset signal 913 at the beginning of each mode, such as in a rotation of modes, from modes control block 903 may be used to set /Q output of register 1303 to a logic low, and generally one second later the one hertz cycle rate of clock signal 1007 resets reset circuit 1301 thus resetting /Q output of register 1303 to a logic high.

Each approximately one second for this embodiment negative pulse of global disable signal 905 provided to power control block 926 will disable, namely tri-state or provide a high impedance state, of Vbus, D+, and D− of USB connector 201. In this state all switches, S1 through S4 are off, namely 0, 0, 0, 0, and transistor Q1 and Q2 are both in an off state for a period of approximately one second to reset a portable device 103 to re-detect state of pins D+ and D−.

As previously described, when computer 101 is powered up, select signal 906 is default logic high and is used to turn on switches S1 for a data communication USB port Mode 1, such as USB 1.1, 2.0, or 3.0. This is a pass through mode as previously described with reference to FIG. 3 and not repeated here for clarity. For a Mode 2, namely a voltage reference requested portable device charger mode, switches S2 are on and switches S1, S3, and S4 are off.

Figure 15:
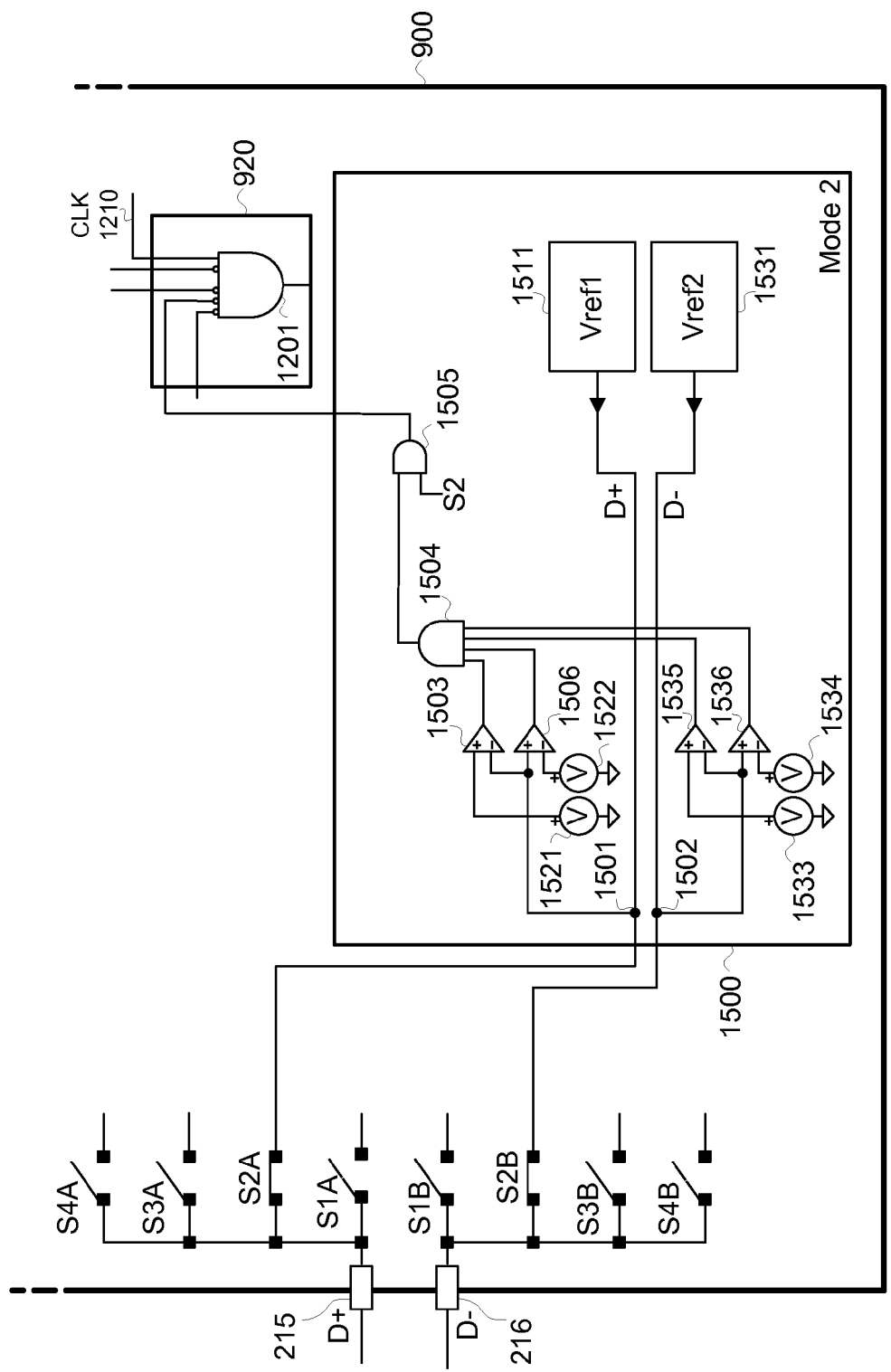
FIG. 15 is as block/circuit diagram depicting an exemplary embodiment of an implementation of a charging mode of the charger device of FIG. 9.

FIG. 15 is a block/circuit diagram depicting an exemplary embodiment of an implementation of mode block 2 1500. For Mode 2, switches S2A and S2B may be on to communicate voltages on D+ pin 215 and D− pin 216 respectively to nodes 1501 and 1502. Portable devices 103 that charge using Mode 2 may have fixed predetermined pull-down resistances on both D+ and D− pins associated with such portable devices. Such pull-down resistances may be any fixed value.

Vref1 is a voltage provided to node 1501 from Vref1 block 1511. When no portable device 103 is plugged into connector 201, Vref1 is greater than a voltage V1 associated with voltage source 1521. Because pull-down resistances are fixed, voltages V1 for voltage source 1521 and V2 for voltage source 1522 may be pre-set. If Vref1 is greater than V1, then V1 of voltage source 1521 is greater than V2 of voltage source 1522. Differential buffer 1503 is coupled to receive Vref1 and V1, where V1 is provided to a plus port thereof and Vref1 is provided to a minus port thereof. Differential buffer 1503 outputs a logic low responsive Vref1 being greater than V1. Output of differential buffer 1503 is provided to AND gate 1504. Output of AND gate 1504 is provided as an input to AND gate 1505, and another input to AND gate 1505 is control signal S2. Accordingly, output of AND gate 1505 is provided to an inverted input of AND gate 1201 for such mode rotation, as S2 when Mode 2 block 1500 is active logic high. For a logic low output from differential buffer 1503, AND gate 1504 outputs a logic low to activate AND gate 1201 via AND gate 1505 to rotate from Mode 2 to Mode 3.

When a portable device 103 is plugged into USB connector 201 that uses Mode 2 as a charging mode, a fixed pull-down resistance ("R_down") inside such portable device drops Vref1 to a voltage such as "Vdrop". V1 of voltage source 1521 is preset such that it is higher than "Vdrop", and voltage V2 of voltage source 1522 is preset lower than "Vdrop". Output of voltage source 1522 is provided to a minus port of differential buffer 1506, and a plus port of differential buffer 1506 is coupled to receive Vref1 from Vref1 voltage source 1511. Output of differential buffer 1506 is provided as an input to AND gate 1504. When a portable device that uses Mode 2 for charging is connected and ready to be charged, outputs of differential buffers 1503 and 1506, as well as AND gate 1504, are all logic high. Because control signal S2 input to AND gate 1505 is also logic high, AND gate 1505 outputs a logic high which disables output of AND gate 1201, as output of AND gate 1505 is provided to an inverted port of AND gate 1201. In other words, mode rotation is stopped and charging device 900 in such state does not rotate out of Mode 2, namely will charge a portable device 103 using Mode 2.

If such portable device is not a voltage reference requested portable device, there should not be a proper pull-down resistance ("R_down") in such portable device. Accordingly, Vdrop should not fall between voltages V1 and V2. Thus, either differential buffer 1503 or differential buffer 1506 outputs a logic low, which via AND gates 1504 and 1505 activates AND gate 1201 to assert rotation mode control signal 922.

The Vref2 block 1531 is for D− pin 216, and voltages V3 and V4 respectively associated with voltage sources 1533 and 1534 are for the same operation described with reference to Vref1 voltage source 1511 and voltage sources 1521 and 1522 for voltages V1 and V2, respectively. Target voltages, or more particularly target resistance drops for D+ and D− pins, may, but need not, be the same. However, the operation as previously described for Vref1 may otherwise equivalent to the operation for Vref2, and thus is not repeated for operation of buffers 1535 and 1536 for purposes of clarity.

As voltages Vref1, Vref2, V1, V2, V3, and V4 may vary from portable device to portable device, such portable devices 103 may be used to determine what the resistance drop is for those devices on D+ and D− pins when in a charging mode.

Figure 16:
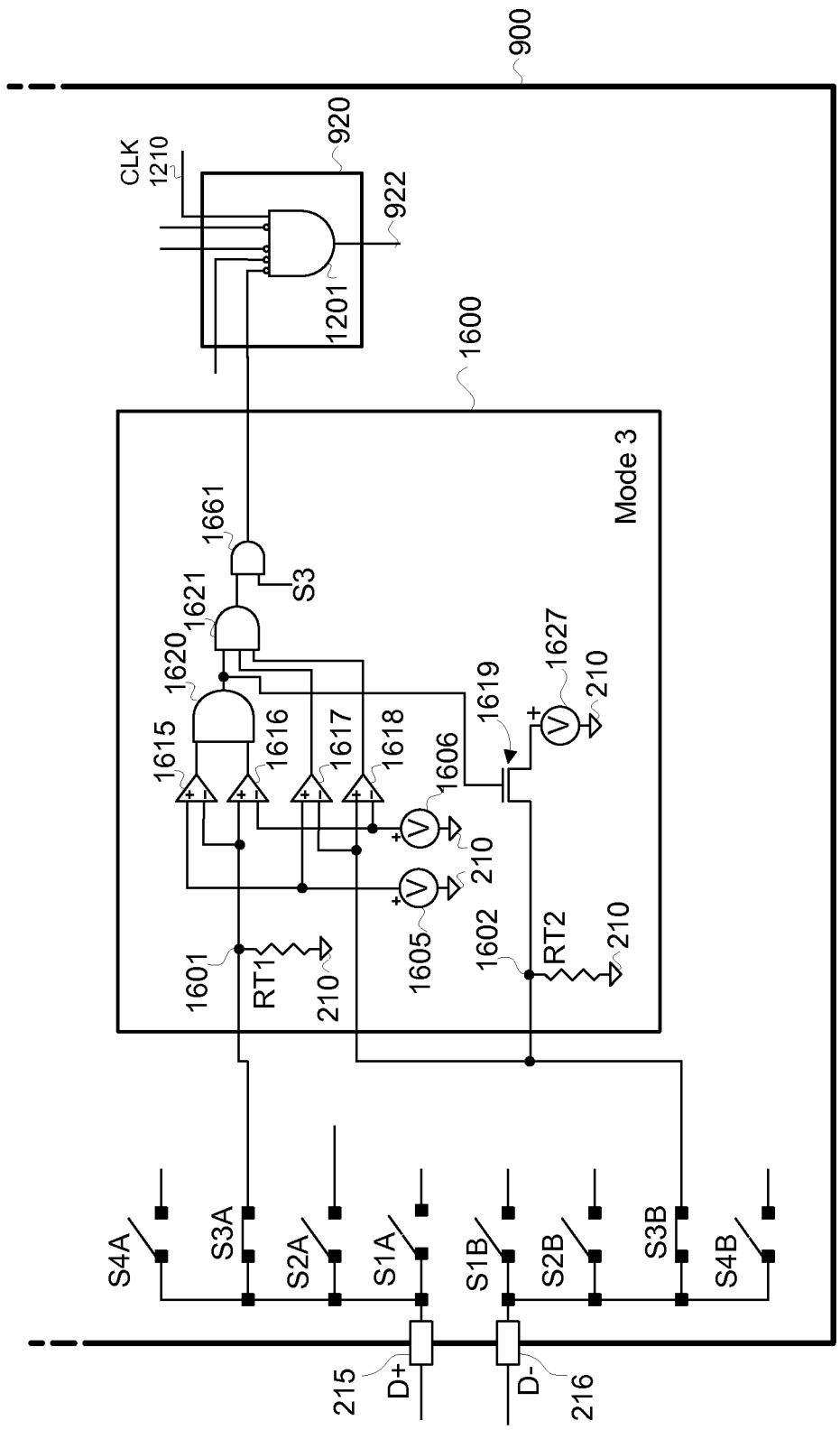
FIG. 16 is a block/circuit diagram depicting an exemplary embodiment of an implementation of another charging mode block of the charger device of FIG. 9.

FIG. 16 is a block/circuit diagram depicting an exemplary embodiment Mode 3 block 1600 of charger device 900. For Mode 3, switches S3 are on or closed, and switches S1, S2, and S4 are off or open. In accordance with the above identified USB charging specification for a host USB charger mode, a portable device implementing such a host charger mode plugged into USB connector 201 sends approximately a 0.7 volt reference voltage to D+ pin 215. Switch S3A is coupled to mode 3 block 1600 at node 1601 and switch S3B is coupled to mode 3 block 1600 at node 1602. Resistors RT1 and RT2 are respectively coupled between ground 210 and nodes 1601 and 1602. For this exemplary embodiment, resistors RT1 and RT2 may each be approximately 15K ohms; however, other resistances may be used depending on application.

Node 1601 is coupled to a minus port of differential buffer 1615 and to a plus port of differential buffer 1616. Node 1602 is coupled to a minus port of differential buffer 1617 and to a plus port of differential buffer 1618. Voltage source 1605 has its positive output coupled to plus input ports of differential buffers 1615 and 1617 for providing a voltage V5 thereto. Voltage source 1606 has its plus terminal coupled to minus inputs of differential buffers 1616 and 1618 for providing a voltage V6 thereto. Voltage sources 1605 and 1606 are each coupled to ground 210. Outputs of differential buffers 1615 and 1616 are provided as inputs to AND gate 1620, and outputs of differential buffers 1617 and 1618, as well as output of AND gate 1620, are provided as inputs to AND gate 1621. Output of AND gate 1621 is provided as an input to AND gate 1661 and another input to AND gate 1661 is S3 control signal. Output of AND gate 1661 is provided to an inverted input port of AND gate 1201 of rotation clock control block 920.

In this example embodiment, it is assumed that voltages of voltage sources 1605 and 1606 are respectively approximately 1.0 volts and 0.4 volts. These voltages are used for purposes of comparison to ensure that Mode 3 is valid; however, other voltage values may be used.

Resistor RT2 is coupled between node 1601 and ground 210, and a drain node of transistor 1619 is coupled to node 1602. A source of NMOS transistor 1619 is coupled to a plus output terminal of voltage source 1627, which voltage source is also grounded to ground 210. A gate of transistor 1619 is coupled to receive output of AND gate 1620.

When there is a 0.7 volt input on D+ pin 215 from a portable device, differential buffers 1615 and 1616 detect such voltage on D+ pin 215 and cause NMOS transistor 1619 via output of AND gate 1620 to go into an on state. With transistor 1619 in a substantially conductive state, a voltage from voltage source 1627, which in accordance with the above-identified specification is a 0.7 volt voltage, is provided back to such portable device on D− pin 216. AND gate 1621 in response to such condition outputs a logic high to AND gate 1661, and as S3 control signal is also a logic high when in Mode 3, output of AND gate 1661 is a logic high for disabling output of AND gate 1201. In other words, rotation control signal 922 is not asserted to modes control block 903 for rotation of modes. Thus, in such condition, device charger 900 stays in Mode 3 for charging a portable device 103. In Mode 3, transistor Q1 is on and transistor Q2 is off for charging a portable device 103.

If a portable device 103 is not detected as having a host charger mode, output of AND gate 1621 is a logic low, and thus output of AND gate 1661 is a logic low. A logic low output from AND gate 1661 to an inverted input port of AND gate 1201 activates mode rotation for rotating to Mode 4.

Figure 17:
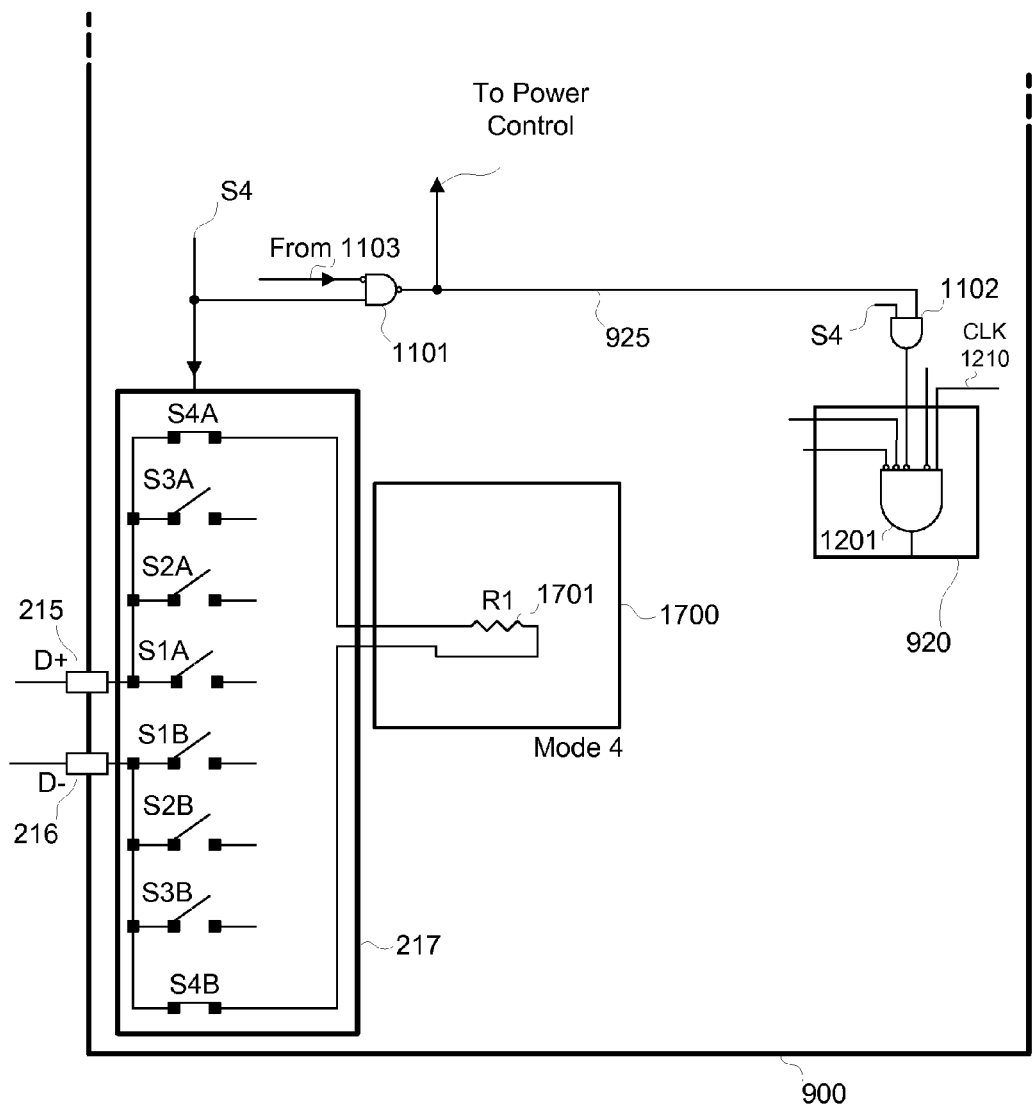
FIG. 17 is a block/circuit diagram depicting an exemplary embodiment of an implementation of yet another charging mode block of the charger device of FIG. 9.

FIG. 17 is a block/circuit diagram depicting an exemplary embodiment of device charger 900 for operating in Mode 4. Mode 4 block 1700 includes a resistor R1 1701. Resistance of resistor R1 1701 may be in a range of approximately 0 to 200 ohms. Generally, resistor R1 is to give the appearance of shorting pins D+ 215 and D− 216 to one another. Accordingly, switches S4 are closed and switches S1 through S3 are open for coupling pins 215 and 216 to resistor R1 1701.

Control signal S4 is provided to an input of NAND gate 1101 and to switch module 217 for closing switches S4A and S4B. Another input to an inverted input port of NAND gate 1101 is output from register 1103 as previously described with reference to FIG. 11. Output of NAND gate 1101 is provided as an input to AND gate 1102 along with control signal S4 as previously described with reference to FIG. 11. Output of NAND gate 1101 is charging control signal 925, and as previously described charging control signal 925 is provided to power control block 926.

When rotating into Mode 4, for a dedicated charger mode as defined in the above-described USB charger specification, charger device 900 generally shorts D+ and D− pins 215 and 216 using a resistor from approximately 0 to 200 ohms. Control signal S4 is a logic high for Mode 4. Output of NAND gate 1101 is activated to allow a charging current detect signal 925 to be provided to transistors Q1 and Q2 via power control block 926, as previously described. Additionally, output of NAND gate 1101 is activated to provide charging current detect signal 925 via AND gate 1102 to AND gate 1201 for disabling output thereof, namely disabling mode rotation.

Figure 18:
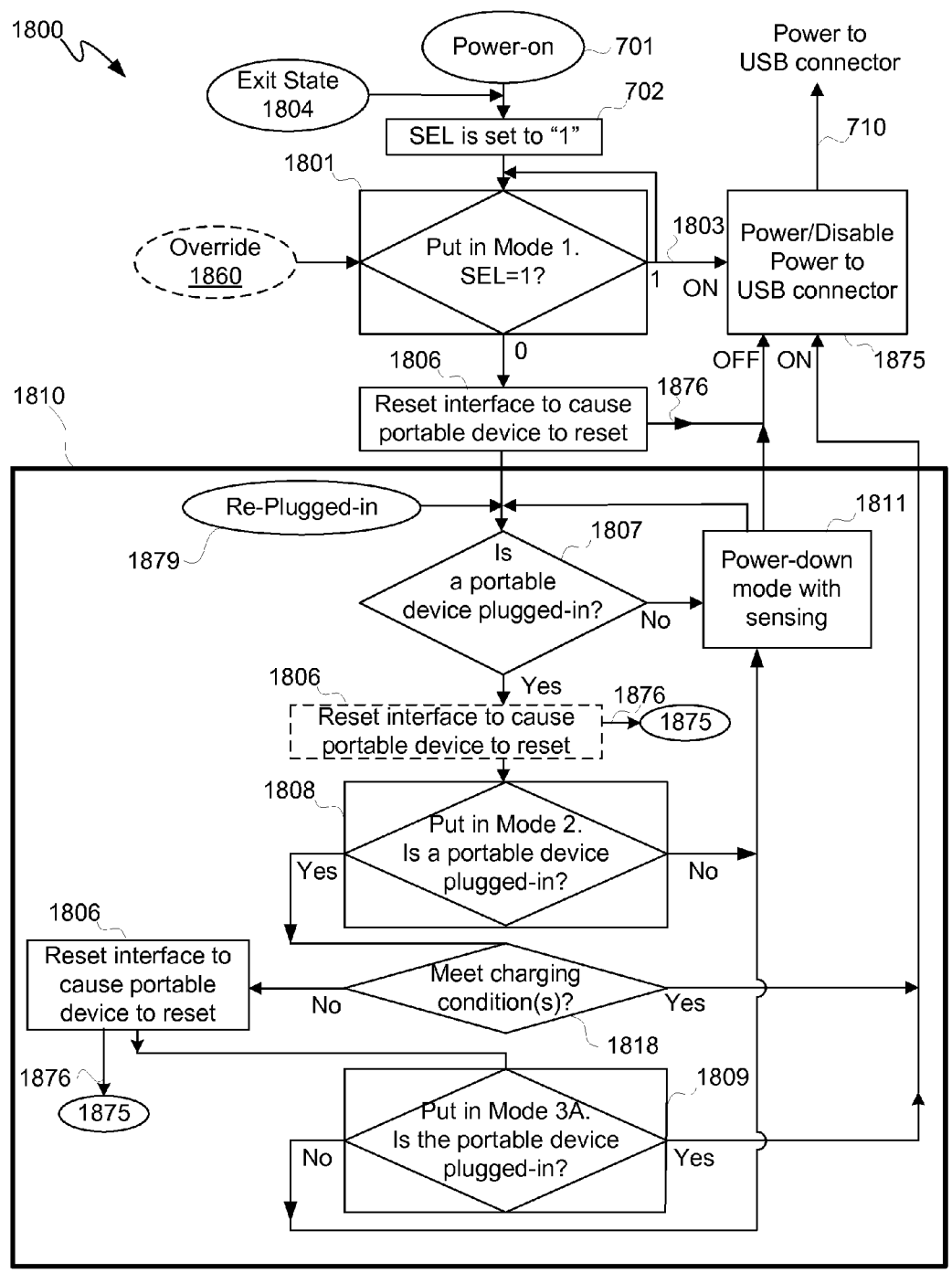
FIG. 18 is a flow diagram depicting an exemplary embodiment of a charging mode detection flow.

FIG. 18 is a flow diagram depicting an exemplary embodiment of a Mode detection flow 1800. FIG. 18 is more closely associated with the exemplary embodiment of FIG. 19, which has three sets of switches S1, S2, and S3 and one power transistor Q1.

At 701, power-on is initiated as previously described. At 702, responsive to a power-on, SEL signal 906 is set to a logic 1. Again, it should be understood that SEL signal 906 may be set by status of mean power of a host device. However, optionally a user may override a logic 1 status of SEL signal 906 as generally indicated at 1860, and thus force SEL to a logic 0 to allow for charging a portable device 103 while in an awake mode. When SEL is set back to logic 1, flow 1800 returns to Mode 1 as generally indicated at 1801. If a sleep, hibernate, or powered-off state is exited for an awake state, then SEL signal 906 transitions from a logic 0 to a logic 1 responsive an increase in the mean power as generally indicated at 1804, SEL is set or reaches a logic 1 at 702 for entering Mode 1 at 1801. Thus, a charging mode may be exited as responsive to such exiting SEL is triggered to logic 1. Operations at 1801 are the same as operations at 703 of FIG. 7, except switch S1, S2, and S3 are used, and those switches are set to 1, 0, 0. Thus, a charger device stays in Mode 1 as generally indicated by arrow 1803 as long as SEL is logic 1. In Mode 1, power is provided to a Vbus pin of a USB connector as generally indicated by arrow 1803, where at 1875 a transistor Q1 is switched on.

If it is determined at 1801 that SEL is set to logic 0, then at 1806 generally mode rotation is invoked with resetting of a USB connector interface to cause a portable device coupled thereto to reset, as previously described with reference to operations at 707 of FIG. 7. Operations at 1806 are generally the same as operations at 707. Switches S1, S2, and S3 are switched open at 1806 to provide a high impedance state of D+ and D− pins of a USB connector, and transistor Q1 is transitioned off at 1875 as generally indicated by arrow 1876 to provide a high impedance state of a Vbus pin of such USB connector.

From 1806 it may be determined whether a portable device 103 is detected at 1807. In this embodiment, a "shell" or shielding layer of cable 105 of FIGS. 1A and 1B is coupled to ground if a portable device is connected to USB connector 201. Accordingly, if ground or approximately zero volts is detected at 1807 by connecting to such "shell", then such a detected voltage indicates that a portable device 103 is connected to a USB connector 201. If, however, it is determined at 1807 that such shell is floating, namely not electrically coupled to a cable 105 coupled to a ground of a portable device 103, then it may be determined that a portable device 103 is not connected to USB connector 201. If it is determined at 1807 that a portable device is connected to a USB connector, then Mode 2 may be entered into at 1808. Optionally, another reset operation at 1806 may be performed between 1807 and 1808 in addition to the reset operation performed before 1807.

Furthermore, if a portable device is re-plugged-in or another portable device is plugged-in in place of a previously plugged-in portable device, as generally indicated at 1879, then operation at 1807 is initiated. If at 1807 no portable device is detected as being plugged-in an associated USB connector, then a power-down mode is entered at 1811 and operation 1807 is repeated. Operation 1807 is repeated as part of charging loop 1810 for detecting whether a portable device plugged-in to such a USB connector. Hence, block 1811 is referred to as a power-down mode with sensing. In such a power-down mode, power to such a USB connector is disabled at 1875 as generally indicated by an arrow associated with arrow 1876 from block 1811 to block 1875.

At 1808, switches S2 are switched on for Mode 2 and it is determined whether a portable device is plugged-in. Again, Mode 2 in this example should not be construed as limiting, as any changing Mode may be used here. Furthermore, charging Modes may be in any order. If no portable device is detected as being plugged in at 1808, then a power-down mode with sensing is entered at 1811 as previously described. If, however, a portable device is detected as being plugged in at 1808, then it is determined at 1818 whether predetermined reference voltages for Mode 2 are present as previously described, namely whether Mode 2 charging conditions are met. If such reference voltages are detected at 1808, then charging is initiated at 1875 by turning on transistor Q1. If, however, at 1818 it is determined that such reference voltages are not present, then a reset operation at 1806 is repeated and it may be determined whether Mode 3A is the charging mode for such portable device at 1809. Mode 3A is a charging mode that generally includes coupling of D+ and D− pins through a resistor R1, which was previously labeled Mode 4 in FIG. 17. However, for this embodiment, as there is no Mode following Mode 3A, then at 1809 Mode 3A is entered, such as by turning on switches S3, without subsequently checking for meeting charging conditions for such Mode 3A. Switches S3 may be thought of as switches S4 of FIG. 17.

At 1809, it is further determined whether a portable device to be charged is still plugged-in. If shell voltage indicates a logic 0 or ground state, then such a portable device is plugged-in and charging commences for Mode 3A at 1875 as previously described by switching transistor Q1 on. If, however, at 1809 it is determined that shell voltage indicates a logic 1, namely no portable device is detected as being plugged-in an associated USB connector, then a power-down mode with sensing is entered at 1811, and operation 1807 is repeated. From such repeat of operation 1807, operations of device charging loop 1810 may be repeated if a portable device is subsequently plugged-in to such a USB connector.

If at 1807, 1808, or 1809 it is determined that no portable device is connected, then at 1811 a power-down mode of USB connector 201 may be initiated to turn all channels (e.g., switches S1 through S3) off until such time as a portable device is detected at any of these respective operations. In a power-down mode, sensing at 1807 continues as to whether a portable device is plugged into a USB connector as block 1811 is a power-down mode with sensing.

Figure 23:
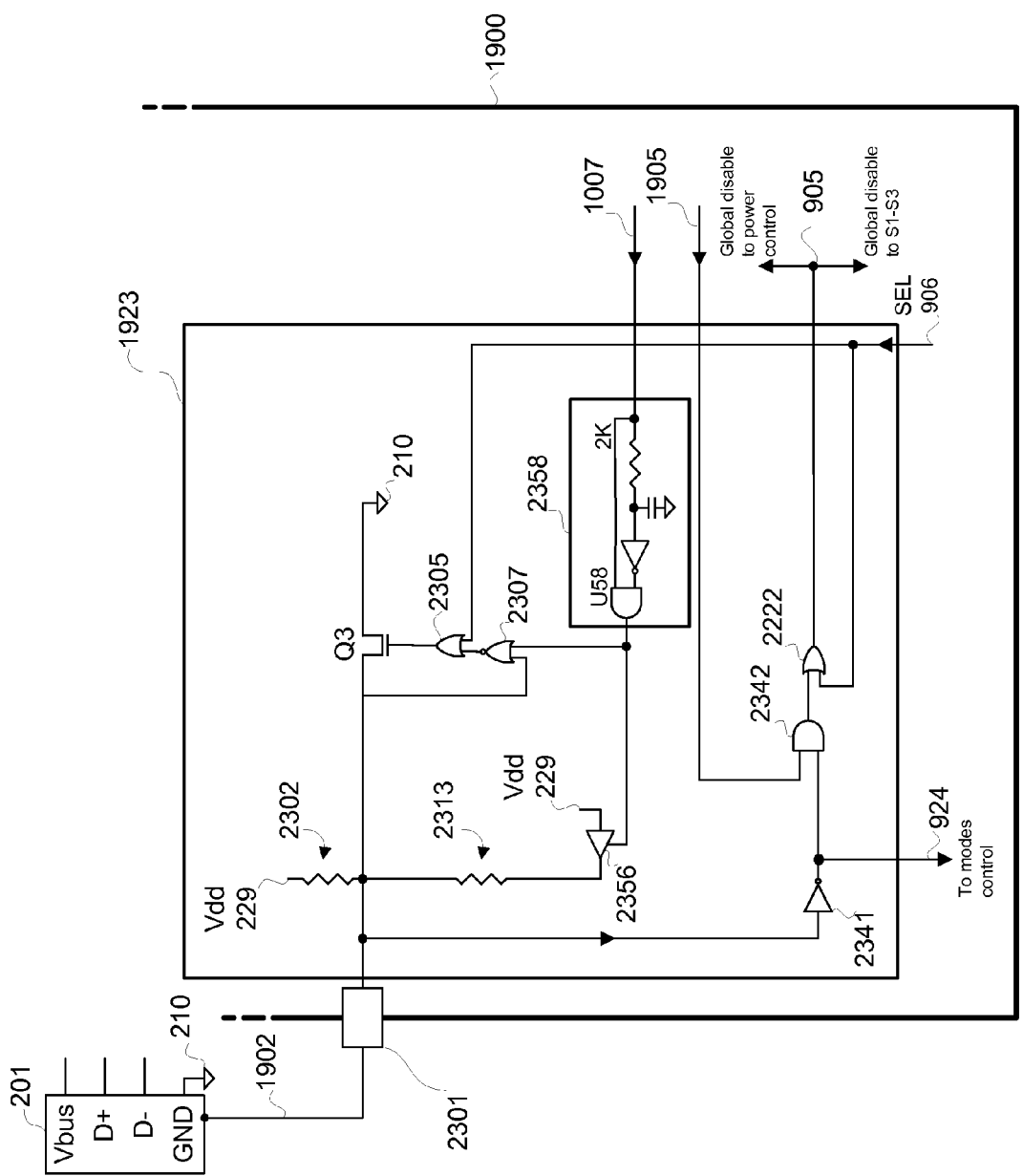
FIG. 23 is a circuit diagram depicting an exemplary embodiment of portable device detection block of charger device.
Figure 24A:
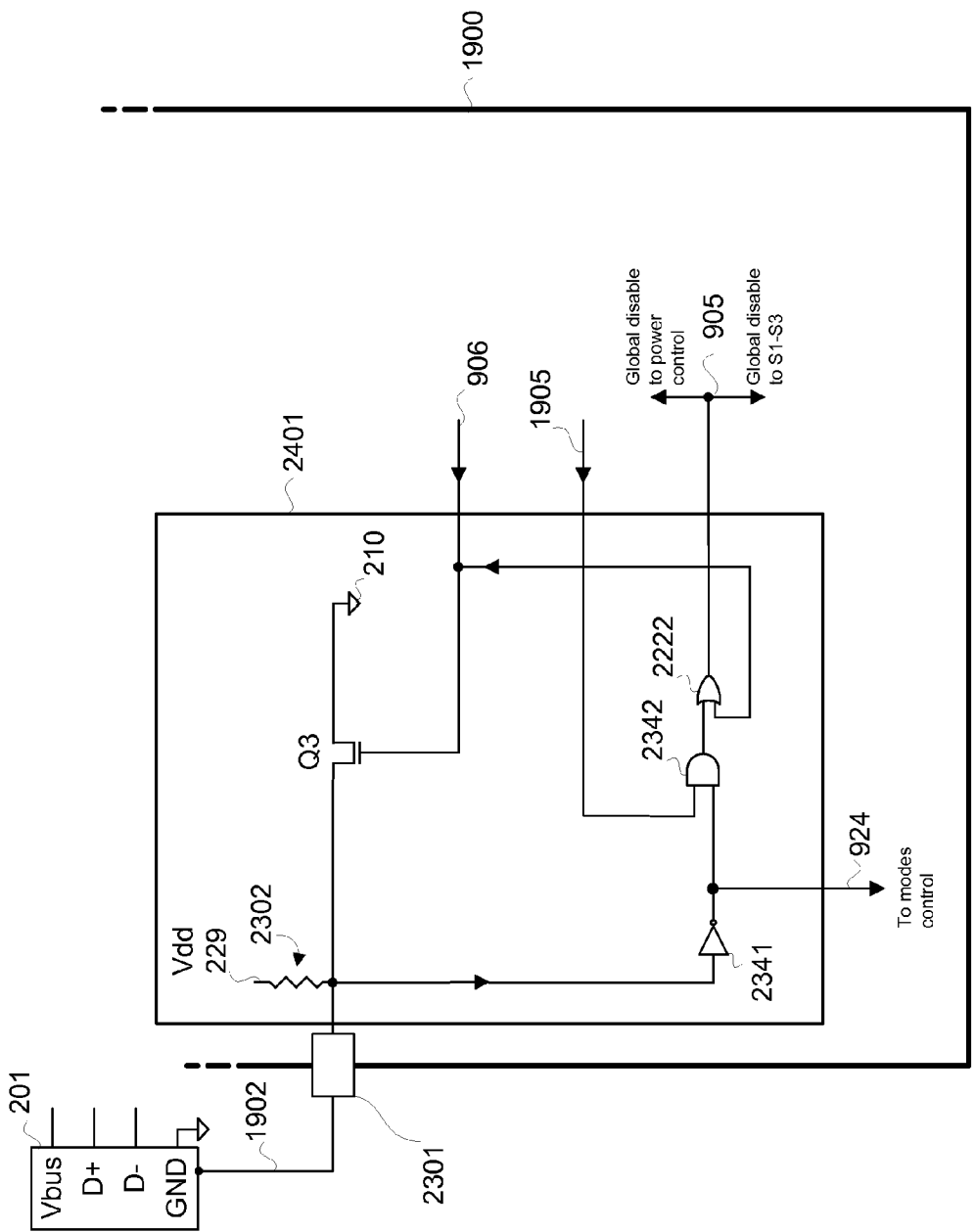
FIGS. 24A and 24B are circuit diagrams depicting exemplary alternative embodiments of a detection block for the charger device of FIG. 19.
Figure 24B:
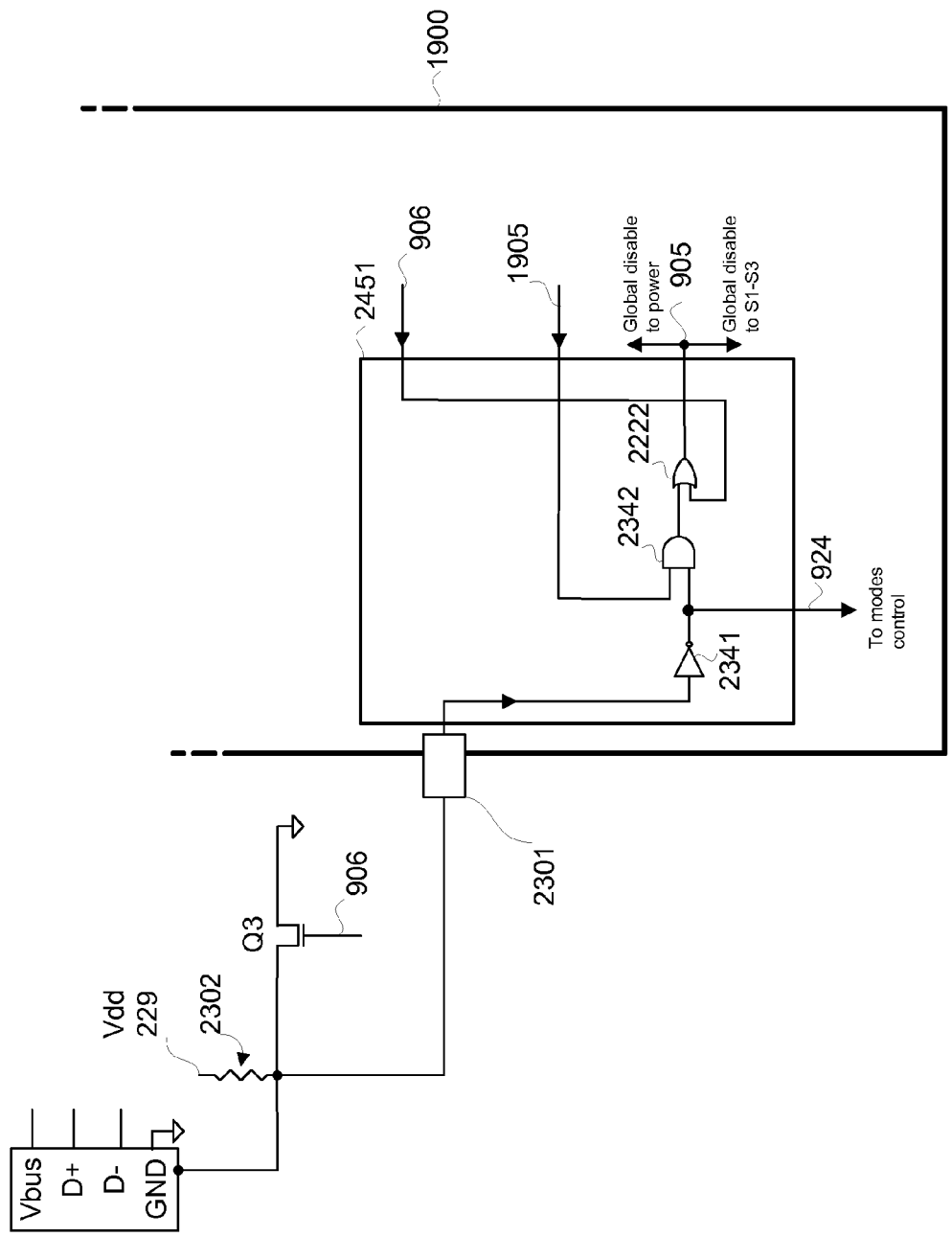

In Mode 1, transistor Q3 of FIGS. 23, 24A, and 24B is on for SEL signal 906 being a logic 1. In such condition, a shell 1902 is electrically coupled to ground 210 via transistor Q3. From a charging mode, such as any of Modes 2 and 3A of FIG. 18 for example, monitoring whether a portable device is plugged-in may be performed by detecting status of shell 1902 voltage at 1807, 1808, and 1809. This monitoring is to determine whether a portable device being charged has been unplugged from a USB connector. If a portable device is detected at 1807, 1808, or 1809, such detection may continue at 1808 and 1809 in the background while charging is being performed. If, however, anytime during charging at 1808 or 1809 it is determined that a portable device has been unplugged from being charged, then a power-down mode with sensing is initiated at 1811.

Thus, it should be understood that a charging state is maintained as long as a portable device is plugged into a USB connector and SEL is logic 0. Furthermore, it should be understood that a USB connector may be a live port for charging even when a host device of a device charger is powered-off, in a sleep state, or in a hibernate state. However, if a portable device is subsequently unplugged charging stops so as to save power. Thus, it should be understood that monitoring of shell voltage status may be continually performed in the background. Furthermore, even though status of SEL of a host device of a charger device has been described for controlling status of Modes, it should be understood that use of a portable device may affect status of Modes. For example, if a portable device is a mobile phone in a charging mode and a phone call comes in, such portable device may exit a charging mode. Thus, one or more charging conditions for such charging Mode would no longer be valid or met at block 1808. Accordingly, optionally at 1809, a check for meeting charging Mode 3A condition(s) may be made when in Mode 3A to determine if a portable device has exited such charging Mode 3A. If such portable device has exited Mode 3A, the charger may stay in Mode 3A, though no longer actually charging such portable device, or may exit Mode 3A and return to 1807. Furthermore, a charging state of a portable device may continue in the background, such as the background of a telephone call for example, depending on configuration of such portable device.

Figure 19:
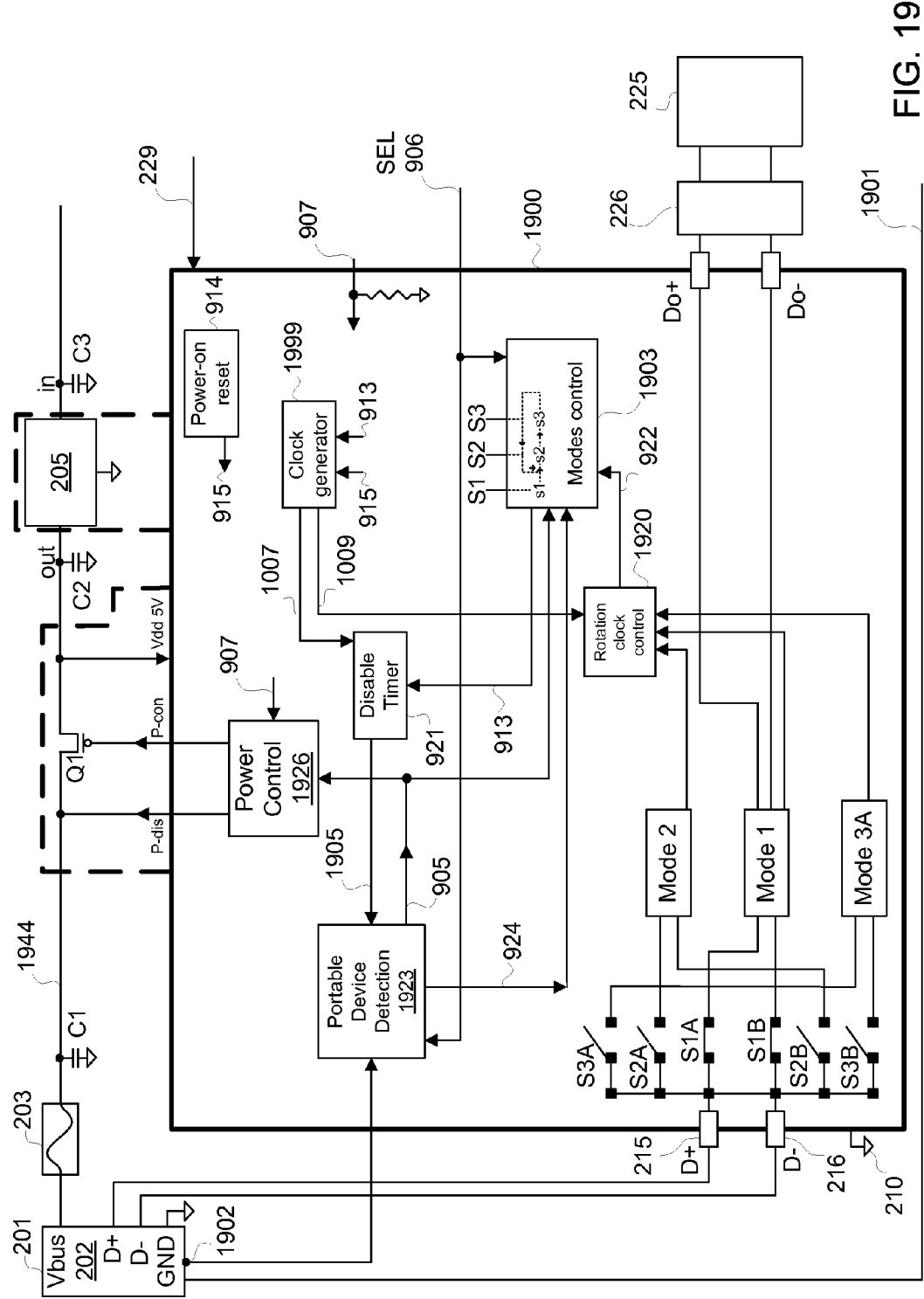
FIG. 19 is a block/circuit diagram depicting an exemplary embodiment of yet another charger device in a computer.

FIG. 19 is a block/circuit diagram depicting an exemplary embodiment of a charger device 1900 in a computer 1901. Computer 1901 may be any type of known computer or other appliance having a USB connector 201 and a USB controller 225 along with power circuitry, as previously described with reference to computers 101 and 901. However, power circuitry of computer 1901 is similar to that of computer 901 of FIG. 9, except rather than two power MOSFETs Q1 and Q2 there is only one power MOSFET, namely transistor Q1.

A shell, generally represented as a node for clarity, 1902 of connector 201 is coupled to a portable device detection block 1923. If portable device detection block 1923 detects the presence of a device coupled to connector 201 as indicated by shell 1902 being grounded, a rotating to Mode 2 signal 924 is asserted by detection block 1923 to modes control block 1903. If, however, no portable device is detected by portable device detection block 1923 as indicated by shell 1902 detected as floating, then portable device detection block 1923 asserts a global disable signal 905. Global disable signal 905 is provided to modes control block 1903 and power control block 1926. Table 2 above may be used as a truth table for charger device 1900 of FIG. 19 for power down option signal 907 and select signal 906.

As indicated in Table 2, if power down option signal 907 is asserted, such as a logic 1 in this example embodiment, then select signal 906 is a don't care and charger device 1900 is in a power down option. If, however, power down option signal 907 is not asserted, namely a logic 0, then for a select signal 906 being a logic 1, a power-on default mode, namely Mode 1, is operative. If, however, both power down option signal 907 and select signal 906 are logic low, then a charging mode is invoked, as previously described charging modes may be automatically rotated between different charging modes until a matching mode is detected. This may occur when computer 1901 is in an awake mode, a sleep mode, a hibernate mode, or a powered down mode.

Table 5 below is a truth table for internal mode control signal status. Control signals S1, S2, and S3 from modes control block 1903, as well as select signal 906, are depicted for each of Modes 1, 2, and 3A, as well as a Mode 0. As these Modes have been previously described, such description is not repeated for purposes of clarity. Again, Mode 3A is Mode 4 as previously described with reference to FIG. 17.

TABLE 5

| Internal modes control signals status | | | | |
|---|---|---|---|---|
| S1 | S2 | S3 | SEL | |
| 1 | 0 | 0 | 1 | Mode 1 |
| 0 | 1 | 0 | 0 | Mode 2 |
| 0 | 0 | 1 | 0 | Mode 3A |
| 0 | 0 | 0 | X | Mode 0 |

Figure 20:
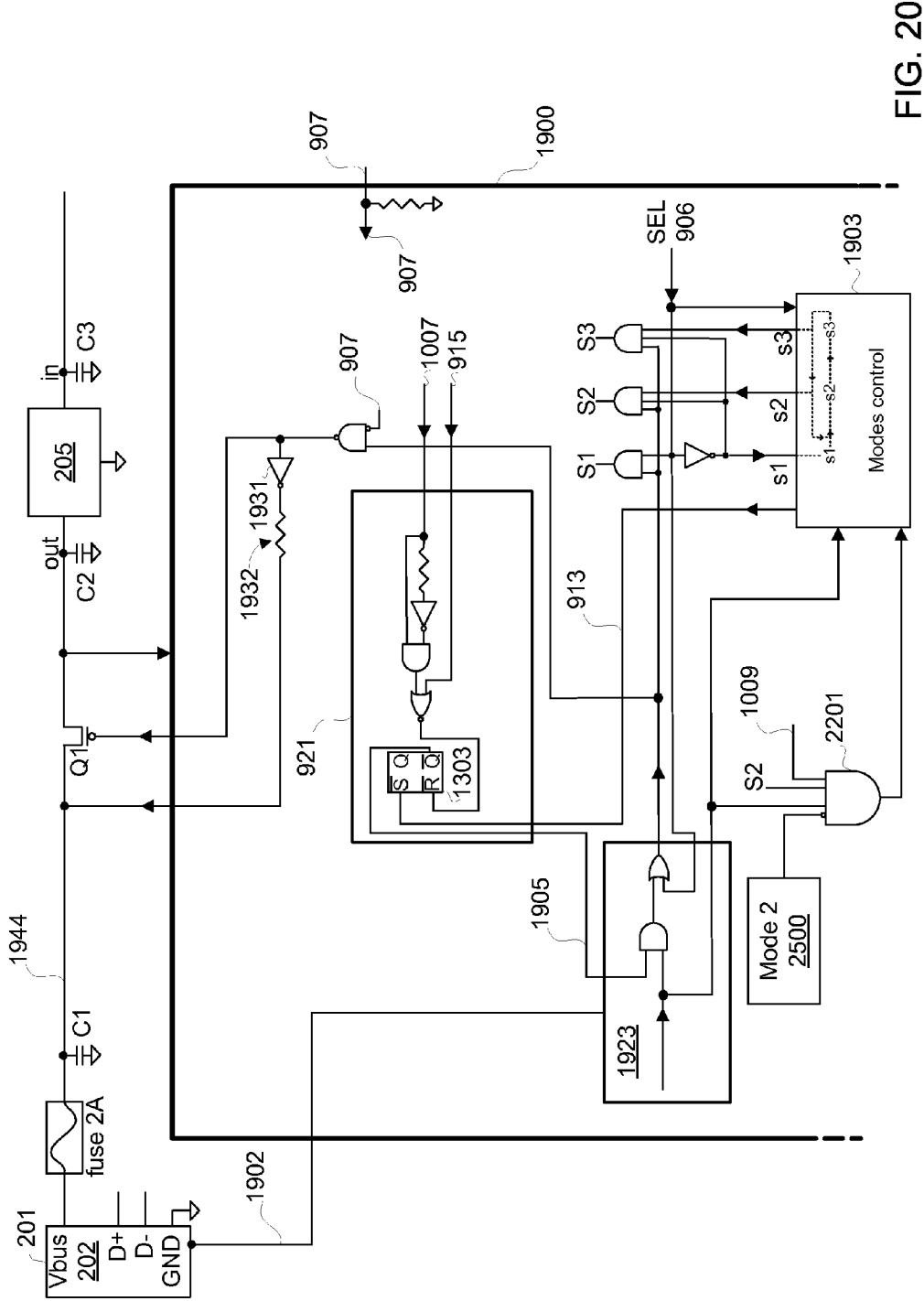
FIG. 20 is a block/circuit diagram depicting an exemplary embodiment a control modes block and associated logic of the charger device of FIG. 19.

FIG. 20 is a block/circuit diagram depicting an exemplary embodiment of charger device 1900 having modes control block 1903 and associated logic. Disable timer 921 is the same as disable timer 921 of FIG. 14 except it is coupled within charger device 1900 somewhat differently. Disable timer 921 is to disable, namely put in a high impedance state, D+ pin 215, D− pin 216, and Vbus pin 202 of connector 201. This disabling is for a reset period of approximately 0.1 to 1.0 seconds, or some reasonable amount of time at the beginning of each Mode change. This mimics the action of re-plugging in a portable device 103 or resetting the USB port 201, and thus causes a portable device 103 to re-detect status on D+ and D− pins 215 and 216 for rotation into a Mode. Again, the example embodiment of a 10 nanosecond low pulse of global reset signal 913 provided to disable timer 921 at the beginning of each mode rotation is used, where global reset signal 913 is provided from modes control block 1903. Again, other pulse durations may be used. Global reset signal 913 sets the /Q output, namely global disable signal 1905, of flip-flop 1303 to low for the duration of such reset period, until clock signal 1007 resets the output of /Q of flip-flop 1303 to a logic high. For a duration of a low pulse of global disable signal 1905 output from disable timer 921, Vbus, D+, and D− pins of USB connector 201 are globally disabled, namely put in a high impedance state for example for a one second duration of time to reset a portable device 103 for re-detection of status of D+ and D− pins. In such state, switches S1 through S3 are in an off position and transistor Q1 is in an off state. To ensure that Vbus 202 of connector 201 reaches 0 volts within the duration of a global disable pulse from global disable signal 1905 from disable timer 921, inverter 1931 and resistor 1932 are coupled in series to output a logic low value to node 1944 to discharge capacitor C1 when transistor Q1 connected to node 1944 is in an off state. Other details regarding FIG. 20 were previously described, and thus are not repeated for purposes of clarity.

Figure 21:
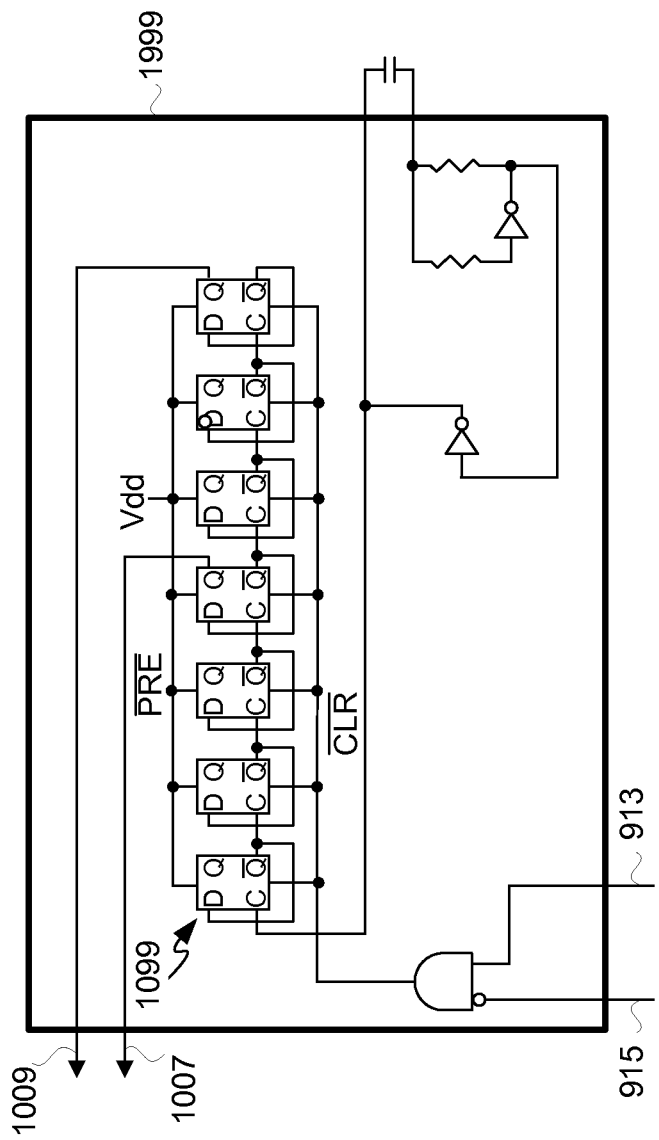
FIG. 21 is a circuit diagram depicting an exemplary embodiment of a clock generator of the charger device of FIG. 19.

FIG. 21 is a circuit diagram depicting an exemplary embodiment of clock generator 1999 of charger device 1900 of FIG. 19. Clock generator 1999 is the same as clock generator 1000 of FIG. 10A, except that fewer flip-flops 1099 are used as only clock signals 1007 and 1009 are produced. Accordingly, repeat description is not provided for purposes of clarity.

Figure 22:
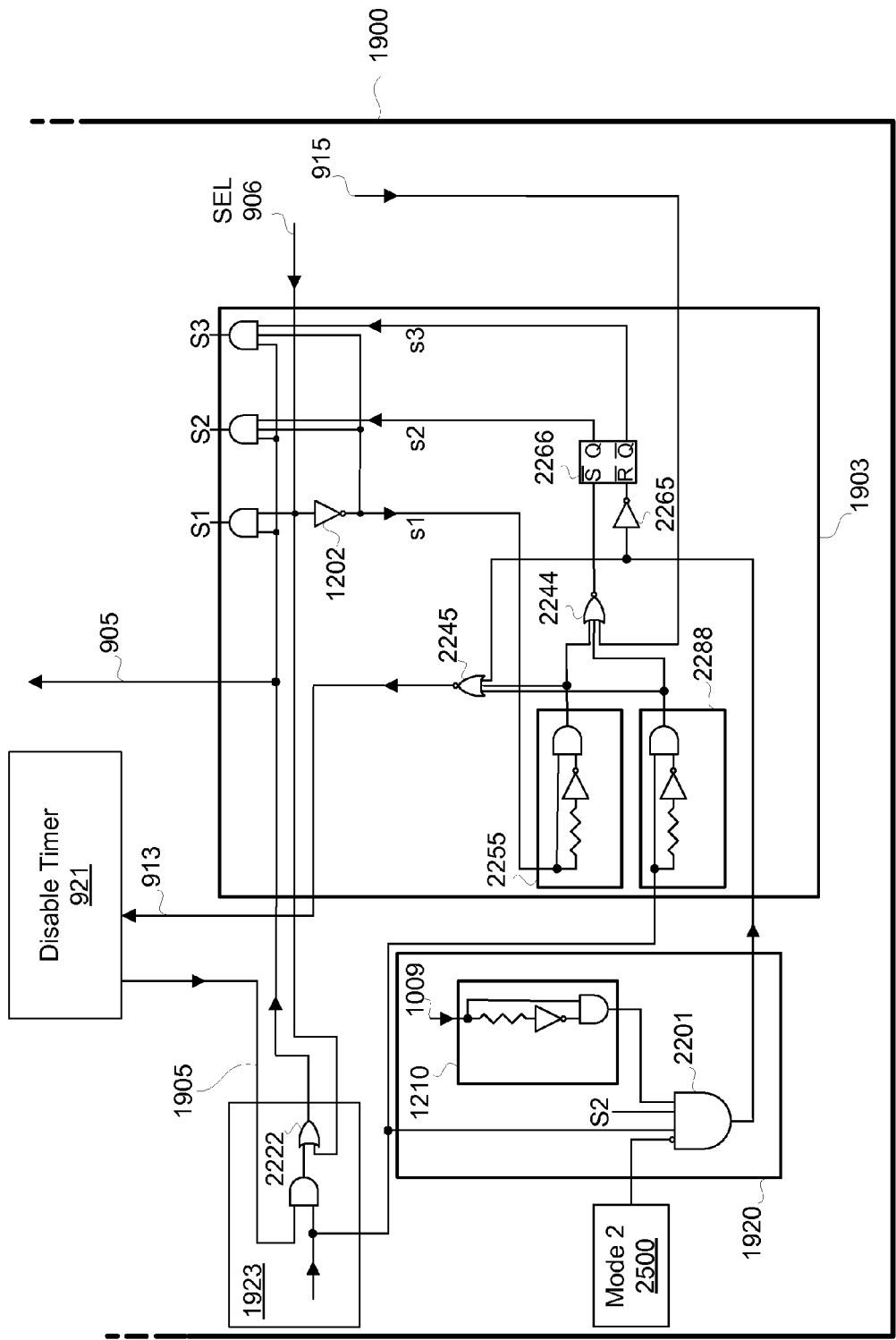
FIG. 22 is a block/circuit diagram depicting exemplary embodiments of a modes control block and a rotation clock control block of the charger device of FIG. 19.

FIG. 22 is a block/circuit diagram depicting an exemplary embodiment of modes control block 1903 and rotation clock control block 1920 of charger device 1900 of FIG. 19. As modes control block 1903 is similar to modes control block 903 of FIG. 9 and as rotation clock control block 1920 is similar to rotation clock control block 920 of FIG. 9, repeated description of same or similar functionality/structure is avoided for purposes of clarity. When select signal 906 is logic high for Mode 1, OR gate 2222 of portable device detection block 1923 and inverter 1202 cause control signals S1 through S3 to respectively be 1, 0, 0 for setting corresponding switches. If select signal 906 changes from a logic 1 to a logic 0, namely rotation to Mode 2, NOR gate 2244 of modes selection block 1903, in conjunction with inverter 1202 and reset circuit 2255, outputs a logic low pulse, such as a 10 nanosecond duration pulse or some other pulse duration, to set output Q of flip-flop 2266 to a logic high. Accordingly, control signals S1, S2, and S3 transition to states 0, 1, 0, which is for a Mode 2, namely a voltage-reference-requested portable device charger mode.

Figure 25:
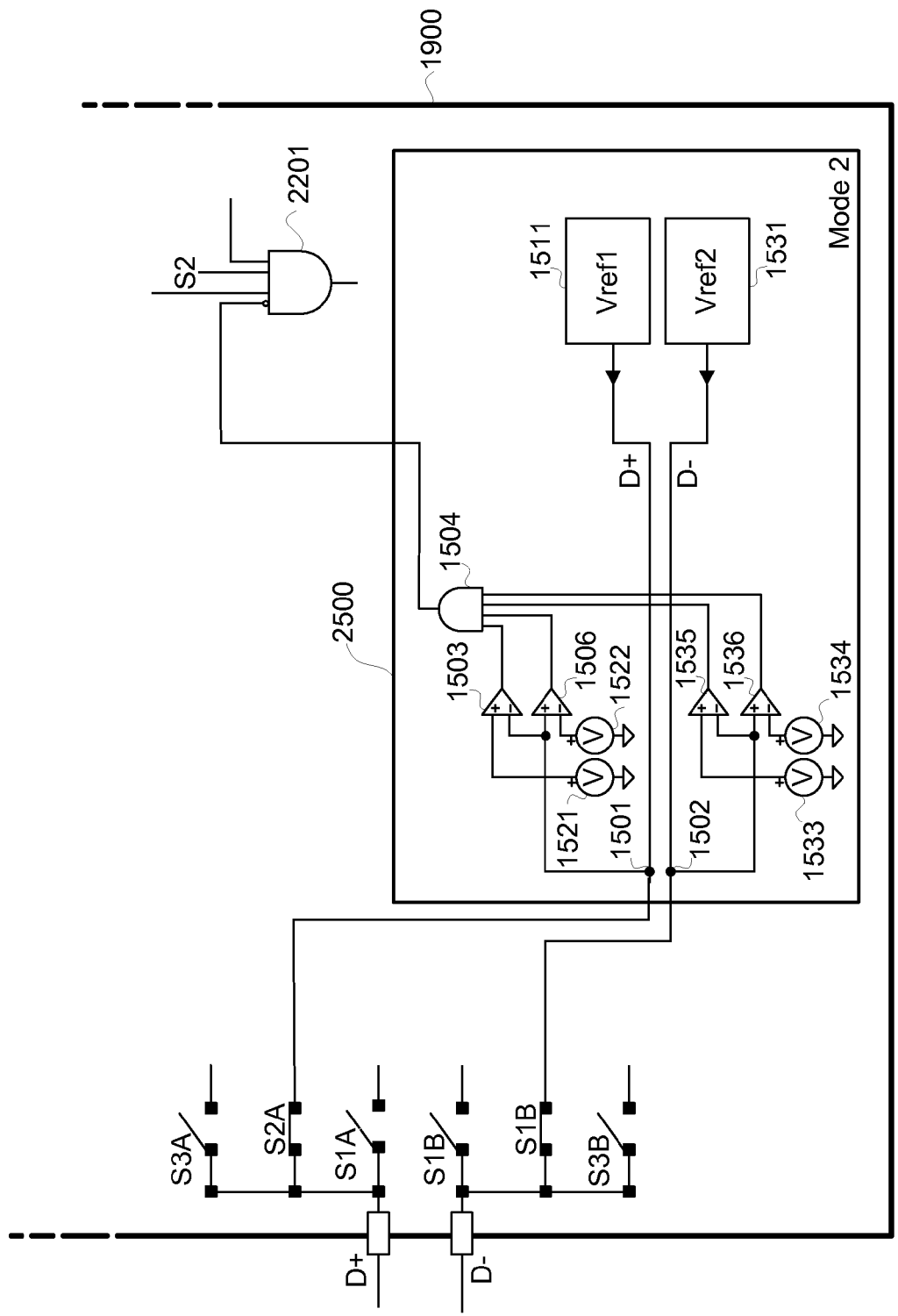
FIG. 25 is a block/circuit diagram depicting an exemplary embodiment of an implementation of a charging mode for the charger device of FIG. 19.

If a portable device 103 coupled to connector 201 is detected as being a voltage-reference-requested portable device for purposes of charging, a Mode 2 block, such as Mode 2 block 2500 of FIG. 25, disables output of AND gate 2201 from mode rotation, namely to stop clocked mode rotation. Thus charger device 1900 stays in Mode 2 for charging of a portable device 103.

If no voltage-reference-requested portable device is detected, Mode 2 block 2500 causes AND gate 2201 output to be asserted for activation of mode rotation. A rising edge in this example of clock signal 1009 passing through reset circuit 1210 generates a high pulse, such as a 10 nanosecond or other pulse duration, for resetting flip-flop 2266 after passing through inverter 2265. Accordingly, Q output of flip-flop 2266 transitions to logic low, and thus control signals S1, S2, and S3 transition to states 0, 0, 1 respectively for Mode 3A, namely a dedicated charger mode. Charger device 1900 may thus stay in Mode 3A for charging a portable device 103.

In Mode 3A, a portable re-plug action generates a logic high for passing through reset circuit 2288 to NOR gate 2244 to set output Q of flip-flop 2266 to a logic high, namely control signals S1, S2, and S3 are 0, 1, 0 for transitioning back to Mode 2. Accordingly, another mode rotation cycle is initiated. Table 6 below is a truth table depicting states of control signals S1, S2, and S3 at the input to reset circuit 2255, the input to reset circuit 2288, and input to reset circuit 1210. Even though rising edge detection is used, it should be appreciated that falling edge detection may be used.

TABLE 6

| Input to Reset Circuit 2255 | Input to Reset Circuit 2288 | Input to Reset Circuit 1210 | S1 | S2 | S3 |
|---|---|---|---|---|---|
| At rise | x | x | 0 | 1 | 0 |
| x | At rise | x | 0 | 1 | 0 |
| x | x | At rise | 0 | 0 | 1 |

At the beginning of any mode change, NOR gate 2245, having inputs from outputs of reset circuits 2255 and 2288 and AND gate 2201, generates a logic low as a global reset signal 913. Global reset signal 913 resets clock output to logic 0 which causes disable timer 921 to generate a logic low pulse, such as a one second duration pulse or some other pulse duration, to disable the USB port, namely to turn transistor Q1 off, as well as to open switches S1 through S3. This is for resetting portable device 103 for re-detection on D+ and D− pins.

FIG. 23 is a circuit diagram depicting an exemplary embodiment of portable device detection block 1923 of charger device 1900. Shell 1902 of USB connector 201 is not directly connected to ground 210 but rather is connected to a detection pin 2301 of charger device 1900. Portable device detection block 1923 detects if a portable device 103 is plugged into USB connector 201. For select signal 906 being logic high, a USB port is in Mode 1. For select signal 906 being logic high, transistor Q3, which in this example is an NMOS transistor, is in an on state. In such an on state, transistor Q3 may have a resistance of approximately 0.6 ohms or less as an on resistance. A maximum of 0.6 ohms is the maximum allowed between shell 1902 and ground 210 in an above-identified USB specification. It should be noted in such above-identified USB specification, grounding of a shell is defined as "shielding grounding." However, it should be understood that in such USB specification, shielding grounding is not the same as "power-current, return-grounding" which is assigned to a ground pin of a USB connector 201. Thus, ground resistance of shell 1902 may be as high as 0.6 ohms and still be within the specified threshold.

When select signal 906 is logic low, a USB port is operating in a USB charging mode. Shell 1902 is floating in a charging mode instead of being generally shorted to ground. It should be understood that for a data communication mode of a USB port, as well as in a USB charging mode, grounding of shell 1902 is for "shielding grounding" and not for "power-current, return-grounding". However, for a charging mode, providing a generally level DC charge is not subject to shielding issues for purposes of data integrity in contrast to a data communication mode.

If there is no portable device 103 plugged into USB device connector 201, resistor 2302 coupled to Vdd 229 at one end and to detection pin 2301 at another end pulls up shell 1902 toward Vdd 229. Resistor 2302 may be any of a variety of resistances for such application, for example, resistor 2302 may be in a range of approximately 33K to 80K ohms. The logic high imparted to detection pin 2301 via resistor 2302 causes OR gate 2222 to output a logic low to provide a global disable signal 905 to power control 1926 to put or maintain transistor Q1 in an off state and to modes control 1903 to disable or open all closed switches of switches S1 through S3.

If a portable device 103 is plugged into USB connector 201, resistor 2302 is grounded to approximately zero volts by shell 1902 of such portable device plugged into connector 201. It should be understood that shell 1902 associated with charger device 1900 has a pull-up resistor 2302, and a shell of a portable device is generally grounded inside such portable device.

Zero volts at detection pin 2301 causes transistor Q3 to go into an on state via OR gate 2305 and NOR gate 2307. For transistor Q3 in an on state, detection pin 2301 may be "locked" to ground regardless of whether such portable device 103 is still electrically coupled to connector 201. This facilitates shell 1902 having a more stable shielding-grounding even though shielding-grounding is generally not significant for DC charging operation of charger device 1900.

Inverter 2341 outputs a logic high to cause mode rotation signal 924 to respectively set control signals S1, S2, and S3 to 0, 1, 0 for Mode 2. Accordingly, it should be understood that when detection pin 2301 is floating, device charger 1900 is in a charging mode. Clock signal 1007 is applied to reset circuit 2358 for periodically generating a high pulse, such as for example an approximately 120 nanosecond high pulse for every one second, to turn off transistor Q3 and activate buffer 2356. Again, pulse durations and intervals other than the examples used herein may be implemented.

Buffer 2356 has its input coupled to Vdd 229, and output of buffer 2356 is coupled to detection pin 2301 via resistor 2313. Buffer 2356 receives an activation signal from the output of reset circuit 2358. The output of reset circuit 2358 is additionally provided as an input to NOR gate 2307. Another input to NOR gate 2307 is coupled to detection pin 2301. Output of NOR gate 2307 is provided as an input to OR gate 2305, and another input to OR gate 2305 is select signal 906. Output of OR gate 2305 is used to gate transistor Q3. Transistor Q3 has its source coupled to ground 210 and its drain coupled to detection pin 2301. Buffer 2356 is activated for a logic high boosting for reestablishing a logic high at detection pin 2301, as resistor 2302 may be too weak for pulling up pin 2301 to at least approximately Vdd at least within a reasonable amount of time.

If a portable device 103 is plugged into USB connector 201, then detection pin 2301 is in a logic low state, and if there is no portable device plugged into USB connector 201, then detection pin 2301 is released from its logic low state allowing it to go to a logic high state. In other words, detection pin 2301 is released from being coupled to ground 210 via transistor Q3.

FIG. 24 is a circuit diagram depicting an exemplary alternative embodiment of a charger device 1900. Charger device 1900 is the same as charger device 1900 of FIG. 19 except that portable device detection block 1923 is replaced with detection block 2401. Detection block 2401 omits reset circuit 2358, OR gate 2305, NOR gate 2307, resistor 2313, and buffer 2356. Pull-up resistor 2302 and transistor Q3 are as previously described with reference to FIG. 23.

When no portable device is plugged into connector 201, a pull-up resistor 2302 coupled to Vdd 229 pulls up detection pin 2301 to a logic high voltage level. Logic high voltage level at pin 2301 causes inverter 2341 to output a logic 0 which is sent to modes control block 1903 via mode rotation signal 924. A logic low output from inverter 2341 means that AND gate 2342 outputs a logic 0 to OR gate 2222. For select signal 906 being logic low, output of OR gate 2222 is a logic 0 which provides a global disable signal 905 to disable power and to disable switches S1 through S3, as previously described.

When a portable device 103 is plugged into connector 201, transistor Q3 responsive to select signal 906 being logic high is in an on state and couples detection pin 2301 to ground 210 such that USB connector 201 may operate for in data communication Mode 1. Furthermore, when a portable device 103 is plugged in, the logic high on detection pin 2301 provided via resistor 2302 is pulled down, such that a logic high output from inverter 2341 is provided as mode rotation control signal 925 to control modes block 1903 to transition to Mode 2.

FIG. 24B is same as FIG. 24A, except that FIG. 24B depicts an exemplary embodiment of a device charger 1900 having a detection block 2451. Detection block 2451 is the same as detection block 2401 except that resistor 2302 and transistor Q3 are external to the IC used to implement device charger 1900 of FIG. 24B.

A Mode 1 block for use with device charger 1900 is the same as previously described with reference to FIG. 3, and thus is not repeated here for purposes of clarity. A Mode 3A block for charger device 1900 is the same as a Mode 4 block 1700 of FIG. 17, and accordingly such description is not repeated here for purposes of clarity.

FIG. 25 is a block/circuit diagram depicting an exemplary embodiment of a Mode 2 block 2500 for charger device 1900. Mode 2 block 2500 is the same as Mode 2 block previously described with reference to FIG. 15 except an AND gate 1505 is omitted. Output of mode block 2500 is provided as an input to AND gate 2201 as illustratively depicted in FIGS. 22 and 25. Because operation and structure of Mode 2 block 2500 is similar to the previously described Mode 2 block, such description is not repeated here for purposes of clarity.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A charging device, comprising:
a mode module configured to provide a plurality of charging conditions associated with a plurality of device types and to provide a data communication mode;
wherein the plurality of charging conditions is associated with a plurality of charging modes;
a switch module coupled to the mode module for selection of either a charging mode of the plurality of charging modes or the data communication mode;
wherein the switch module includes first switches and second switches;
wherein the switch module is coupled to switch from the first switches to the second switches for the selection of either the charging mode or the data communication mode;
control circuitry coupled to provide an interruption in a distribution of power to a peripheral bus;
wherein a device type of the plurality of device types is identified by correspondence with the charging mode selected;
wherein the control circuitry is configured to re-initiate a charging mode detection loop for charging a portable device responsive to a power-down or low power state of the portable device halting the charging of the portable device; and
wherein the interruption is for a duration sufficient to cause the portable device coupled to the charging device via the peripheral bus to initiate a re-detect for switching between the plurality of charging modes.

2. The charging device according to claim 1, wherein the control circuitry is configured to generate a control signal to provide the interruption of the distribution of power.

3. The charging device according to claim 1, further comprising:
a bus controller coupled to the mode module for the data communication mode; and
a device detector coupled to the peripheral bus to detect presence of a physical parameter.

4. The charging device according to claim 1, wherein the plurality of mode blocks are for selective coupling to the peripheral bus via the switch module responsive to the charging mode selected.

5. The charging device according to claim 1, wherein the plurality of charging modes use a different subset of the plurality of charging conditions to provide the charging mode selected.

6. The charging device according to claim 1, further comprising a power module to provide power to the peripheral bus.

7. A method for charging a portable device, comprising:
determining whether a first charging condition for a first charging mode is at least substantially matched by a charging device for the charging of the portable device;
responsive to the first charging condition not being at least substantially matched, generating a control signal to cause an interruption in distribution of power to a peripheral bus;
switching from first switches associated with the first charging mode to second switches associated with a second charging mode;
determining whether a second charging condition for the second charging mode is at least substantially matched;
wherein a mode module is configured to provide the first charging condition and the second charging condition to provide the first charging mode and the second charging mode, respectively, and configured to provide a data communication mode;
wherein a switch module is coupled to the mode module for selection of either a charging mode among a plurality of charging modes or the data communication mode;
wherein the plurality of charging modes include the first charging mode and the second charging mode for the selection of the charging mode;
responsive to the second charging condition being at least substantially matched;
identifying a device type from a plurality of device types corresponding to the second charging condition;
passing of power for charging in the second charging mode;
entering a power-down or low power state for the portable device;
wherein the power-down or low power state halts the passing of power for the charging of the portable device;
while in the power-down mode or low power state, re-initiating a charging mode detection loop to re-initiate the passing of power for the charging of the portable device; and wherein the interruption is for a duration sufficient to cause the portable device coupled to the charging device to initiate a re-detect to accommodate switching between at least the first charging mode and the second charging mode.

8. The method according to claim 7, further comprising responsive to the second charging condition not being at least substantially matched, detecting the peripheral bus for presence of a physical parameter.

9. The method according to claim 7, further comprising responsive to the first charging condition being at least substantially matched, passing power for charging in the first charging mode.

10. The method according to claim 7, wherein charging in the first charging mode or the second charging mode is maintained during a sleep mode, hibernate mode, or a powered-off mode for the power-down or low power state of the portable device having access to the charging device configured to selectively provide the first charging mode and the second charging mode.

11. The method according to claim 7, wherein the first charging mode and the second charging mode respectively have the first charging condition and the second charging condition different from one another.

12. The method according to claim 7, wherein the first charging mode and the second charging mode are cycled as part of the charging mode detection loop responsive to both the first charging condition and the second charging condition not being at least substantially matched.

13. The method according to claim 7, wherein the first charging condition or the second charging condition determination includes detection of a physical parameter.

14. The method according to claim 7, further comprising:
entering the charging mode detection loop; and
in the charging mode detection loop, responsive to the second charging condition being at least substantially matched, branching out of the charging mode detection loop to initiate the passing of power for charging in the second charging mode.

15. The method according to claim 7, further comprising:
initiating detection for presence of a physical parameter associated with the portable device;
wherein if the physical parameter is detected, the charging mode detection loop is entered.

16. The method according to claim 7, further comprising detecting at the peripheral bus a physical parameter associated with power consumption.

17. The method according to claim 7, further comprising:
ascertaining that the data communication mode is not in use; and
responsive to the data communication mode not being in use,
generating the control signal; and
determining whether either the first charging condition or the second charging condition respectively for the first charging mode or the second charging mode is at least substantially matched.

18. The method according to claim 7, wherein the peripheral bus is a Universal Serial Bus ("USB").

19. A charging device, comprising:
a mode module configured to provide a plurality of charging conditions and to provide a data communication mode;
wherein the plurality of charging conditions are associated a plurality of charging modes;
wherein the plurality of charging modes are associated with a plurality of device types;
a switch module coupled to a peripheral bus and the mode module for selection of either a charging mode of the plurality of charging modes or the data communication mode;
wherein the switch module includes first switches and second switches;
wherein the switch module is coupled to switch from the first switches to the second switches for the selection of either the charging mode or the data communication mode;
wherein the peripheral bus is a Universal Serial Bus ("USB");
wherein the selection of the charging mode of the plurality of charging modes is for charging during a sleep mode of a portable device;
a bus controller coupled to the mode module for the data communication mode;
control circuitry coupled to provide an interruption in a distribution of power to a peripheral bus;
wherein a device type of the plurality of device types is identified by correspondence with the charging mode selected;
wherein the control circuitry is configured to re-initiate a charging mode detection loop for the charging of the portable device responsive to the sleep mode of the portable device halting the charging of the portable device; and
wherein the interruption is for a duration sufficient to cause the portable device coupled to the charging device via the peripheral bus to initiate a re-detect for switching between the plurality of charging modes.

* * * * *